United States Patent
Takeoka et al.

(10) Patent No.: US 10,509,401 B2
(45) Date of Patent: Dec. 17, 2019

(54) INFORMATION PROCESSING DEVICE AND INFORMATION PROCESSING METHOD

(71) Applicant: SONY CORPORATION, Tokyo (JP)

(72) Inventors: Yoshiki Takeoka, Tokyo (JP); Manabu Kii, Tokyo (JP); Yasuhide Hosoda, Kanagawa (JP); Toshiyuki Kawamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 15/535,641

(22) PCT Filed: Oct. 30, 2015

(86) PCT No.: PCT/JP2015/080767
§ 371 (c)(1),
(2) Date: Jun. 13, 2017

(87) PCT Pub. No.: WO2016/117204
PCT Pub. Date: Jul. 28, 2016

(65) Prior Publication Data
US 2017/0351257 A1   Dec. 7, 2017

(30) Foreign Application Priority Data
Jan. 23, 2015  (JP) ................................ 2015-011057

(51) Int. Cl.
*G05D 1/00*  (2006.01)
*A45C 13/00*  (2006.01)
(Continued)

(52) U.S. Cl.
CPC ......... *G05D 1/0088* (2013.01); *A45C 13/001* (2013.01); *A45F 5/00* (2013.01);
(Continued)

(58) Field of Classification Search
CPC .... G05D 1/0088; G05D 1/102; A45C 13/001; A45F 5/00; A45F 5/02; B64C 39/02
See application file for complete search history.

(56) References Cited

U.S. PATENT DOCUMENTS 3,891,165 A * 6/1975 Day ........................ B64D 3/00
                                                          244/137.4
8,700,236 B1 * 4/2014 Berman ................. G07C 5/008
                                                            701/15
(Continued)

FOREIGN PATENT DOCUMENTS

| JP | 2004-193932 A | 7/2004 |
| JP | 2006-123014 A | 5/2006 |
| JP | 2006-134221 A | 5/2006 |

OTHER PUBLICATIONS

International Search Report and Written Opinion of PCT Application No. PCT/JP2015/080767, dated Dec. 28, 2015, 1 pages of English Translation and 7 pages of ISRWO.

*Primary Examiner* — Behrang Badii
*Assistant Examiner* — Daniel L Greene
(74) *Attorney, Agent, or Firm* — Chip Law Group

(57) ABSTRACT

Provided is an information processing device that is capable of switching between a state in which a device is carried and a state in which the device is not carried in a more suitable form in accordance with a state or situation in which the device is used. The information processing device includes an acquisition unit that acquires information on a user and a controller that executes a control process for moving a device that can be carried by the user so that the device changes between a carry state in which the device is carried by the user and a non-carry state in which the device is not carried by the user on the basis of the information on the user.

19 Claims, 11 Drawing Sheets

(51) Int. Cl.
  *A45F 5/00* (2006.01)
  *B64C 39/02* (2006.01)
  *A45F 5/02* (2006.01)
  *G05D 1/10* (2006.01)
  *B64D 47/08* (2006.01)

(52) U.S. Cl.
  CPC .............. *A45F 5/02* (2013.01); *B64C 39/024* (2013.01); *G05D 1/102* (2013.01); *A45F 2005/008* (2013.01); *B64C 2201/027* (2013.01); *B64C 2201/141* (2013.01); *B64C 2201/146* (2013.01); *B64C 2201/20* (2013.01); *B64C 2201/203* (2013.01); *B64D 47/08* (2013.01)

(56) References Cited

U.S. PATENT DOCUMENTS

| | | | |
|---|---|---|---|
| 2011/0130913 A1* | 6/2011 | Duggan | G05D 1/0061 701/23 |
| 2013/0057696 A1* | 3/2013 | Felt | H04N 7/186 348/158 |
| 2014/0330456 A1* | 11/2014 | Lopez Morales | G06Q 10/08355 701/3 |
| 2015/0370250 A1* | 12/2015 | Bachrach | G05D 1/0016 701/2 |
| 2016/0241767 A1* | 8/2016 | Cho | H04N 5/23203 |
| 2017/0043872 A1* | 2/2017 | Whitaker | B64D 1/18 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/080767 filed on Oct. 30, 2015, which claims priority benefit of Japanese Patent Application No. JP 2015-011057 filed in the Japan Patent Office on Jan. 23, 2015. Each of the above-referenced applications is hereby incorporated herein by reference in its entirety.

TECHNICAL FIELD

The present disclosure relates to an information processing device, an information processing method, and a program.

BACKGROUND ART

In recent years, types of devices referred to as so-called information processing devices have been diversified in accordance with development of communication techniques and reduction in the size of various devices, and not only personal computers (PCs) and the like but also devices that can be carried by users, such as smartphones and tablet terminals, have been diffused. Further, in recent years, a so-called wearable terminal, which can be used while being carried by a user when the user wears the wearable terminal on a part of a body of the user, has also been proposed as a portable device.

Further, among the devices described above, a device that communicates with a user to recognize a desire of the user and execute various functions in accordance with the desire (for example, robot) is also proposed, and those information processing devices include a portable information processing device. For example, Patent Literature 1 discloses an example of a system in which a user carries a device that can communicate with the user.

CITATION LIST

Patent Literature

Patent Literature 1: JP 2004-193932A

DISCLOSURE OF INVENTION

Technical Problem

As described above, among devices such as so-called information processing devices, devices having a high function, high performance, and a small size have also been diffused, and use purposes thereof have also been diversified. Therefore, it is expected that a frequency of using the devices is further increased.

Meanwhile, as a method of using the devices described above, it is not necessarily preferable that the user use the devices while carrying the devices, and, for example, it can also be expected that, depending on a use scene of the device (that is, a state or situation in which the device is used), it is desirable that the user use the device while not carrying the device (for example, the user use the device while not wearing the device).

In view of this, the present disclosure proposes an information processing device, an information processing method, and a program, each of which is capable of switching a state in which a device is carried and a state in which the device is not carried in a more suitable form in accordance with a state or situation in which the device is used.

Solution to Problem

According to the present disclosure, there is provided an information processing device including: an acquisition unit configured to acquire information on a user; and a controller configured to execute a control process for moving a device that can be carried by the user so that the device changes between a carry state in which the device is carried by the user and a non-carry state in which the device is not carried by the user on the basis of the information on the user.

Further, according to the present disclosure, there is provided an information processing method including: acquiring information on a user; and executing, by a processor, a control process for moving a device that can be carried by the user so that the device changes between a carry state in which the device is carried by the user and a non-carry state in which the device is not carried by the user on the basis of the information on the user.

Further, according to the present disclosure, there is provided a program causing a computer to execute acquiring information on a user, and executing a control process for moving a device that can be carried by the user so that the device changes between a carry state in which the device is carried by the user and a non-carry state in which the device is not carried by the user on the basis of the information on the user.

Advantageous Effects of Invention

As described above, the present disclosure provides an information processing device, an information processing method, and a program, each of which is capable of switching a state in which a device is carried and a state in which the device is not carried in a more suitable form in accordance with a state or situation in which the device is used.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
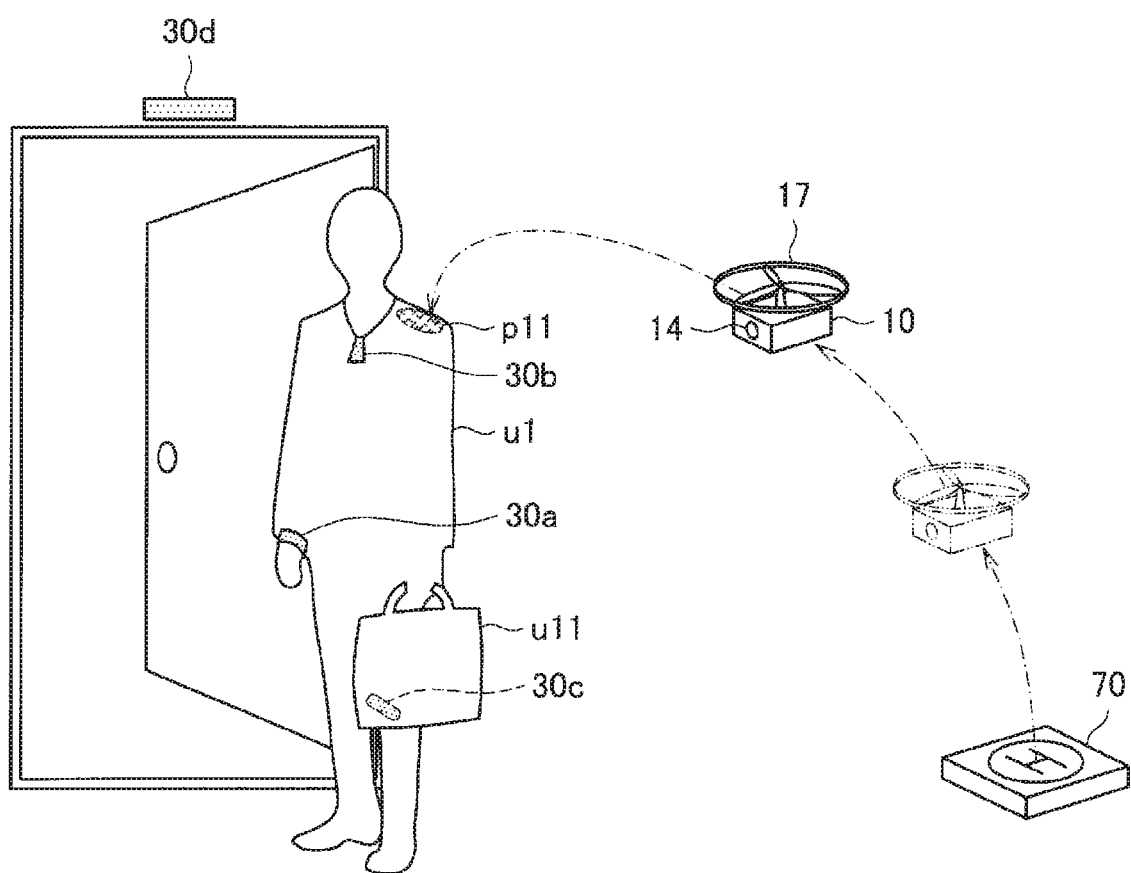
FIG. 1 is an explanatory view for describing an outline of a system to which an information processing device according to an embodiment of the present disclosure is applied.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Outline
2. Functional configuration
3. Processing
4. Modification examples
4.1. Modification example 1: Example of operation in carry mode
4.2. Modification example 2: Example of control in accordance with user
4.3. Modification example 3: Example where a plurality of information processing devices are associated
5. Examples
6. Hardware configuration
7. Conclusion

1. OUTLINE

Figure 2:
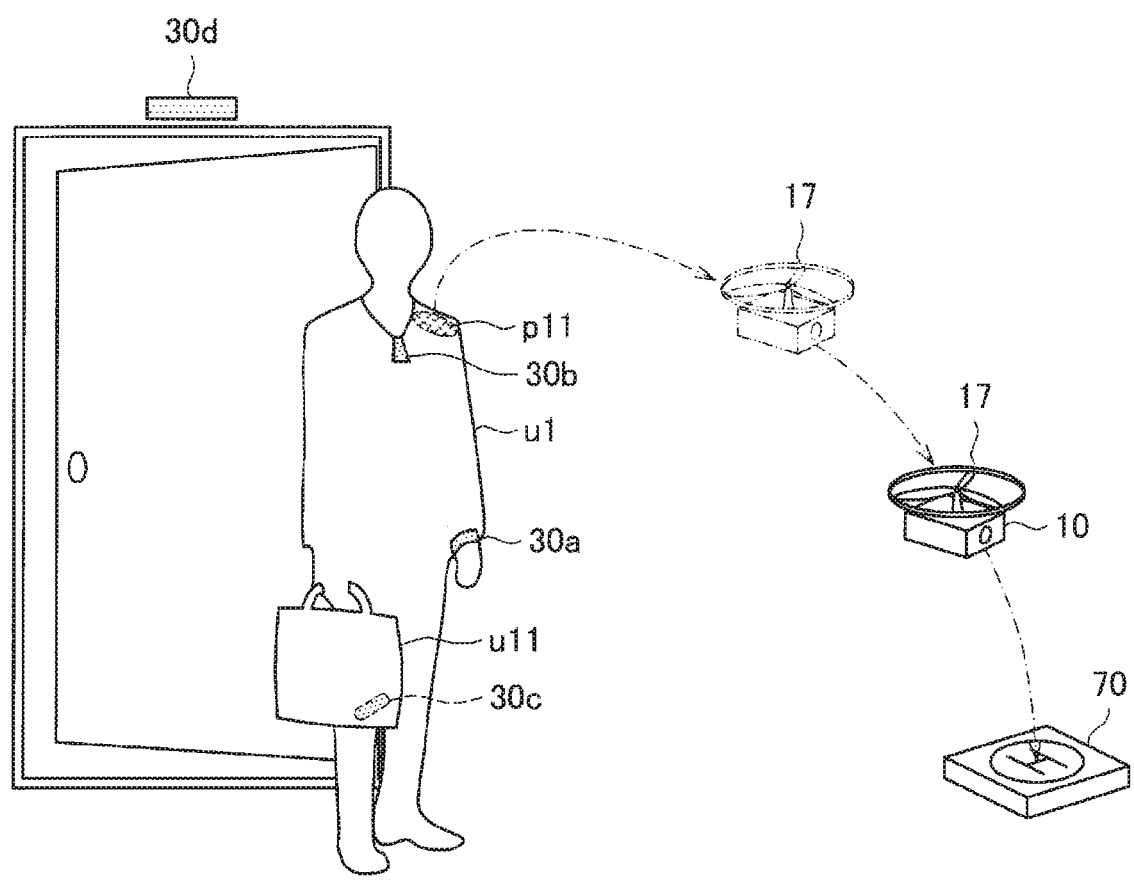
FIG. 2 is an explanatory view for describing an outline of the system to which the information processing device according to this embodiment is applied.

First, an outline of a system to which an information processing device according to an embodiment of the present disclosure is applied will be described with reference to FIG. 1 and FIG. 2. FIG. 1 and FIG. 2 are explanatory views for describing the outline of the system to which the information processing device according to the present embodiment is applied.

As shown in FIG. 1, an information processing device 10 according to the present embodiment includes a drive unit 17 and is movable by driving the drive unit 17. As a specific example, in an example shown in FIG. 1, the information processing device 10 includes a flight mechanism such as a propeller as the drive unit 17 and moves by flying with the use of the flight mechanism.

An operation mode of the information processing device 10 is switched between a mode in which a user carries the information processing device 10 and another mode different from the above mode in accordance with various states or situations (hereinafter, generally described as "various states" in some cases) such as recognized behavior of the user, a recognized state of the user, and a recognized surrounding environment (external environment). Note that, hereinafter, the mode in which the user carries the information processing device 10 will be described as "carry mode" in some cases.

For example, in the example shown in FIG. 1, in a case where, for example, the user is staying at home, the information processing device 10 stands by on a charging stand 70 for charging a battery and, when the information processing device 10 detects behavior in which a user u1 moves to the outside (for example, behavior of moving toward an entrance), the information processing device 10 causes the operation mode to transition to the carry mode. Note that, hereinafter, a mode showing a state in which the information processing device 10 stands by at a position that satisfies a predetermined condition, such as the charging stand 70, will be described as "stand-by mode" in some cases.

As a specific example, the information processing device 10 includes an imaging unit 14 for capturing an image and a detection device including various sensors and can recognize various states such as behavior of the user, a state of the user, and a surrounding environment (external environment) on the basis of information acquired by the imaging unit 14 and the detection device. Further, the information processing device 10 may recognize the user u1 by analyzing an image captured by the imaging unit 14.

Further, the information processing device 10 can communicate with another information processing device via a wireless or wired network and may recognize the various states on the basis of information detected by the another information processing device. Note that, hereinafter, another information processing device that can be associated with the information processing device 10 will be described as "information processing device 30" in some cases in order to differentiate the another information processing device from the information processing device 10. For example, in FIG. 1, various devices denoted by reference signs 30a to 30d show examples of the information processing device 30 that can communicate with the information processing device 10.

Specifically, the information processing devices 30a and 30b show examples of the information processing device 30 configured as a so-called wearable device that is used by the user u1 while being worn on a part of a body of the user u1. As described above, the information processing device 30 configured as a wearable device may, for example, acquire information for recognizing the behavior or state of the user by using various sensors included therein. As a specific example, the information processing device 10 may recognize whether or not the user u1 is moving (for example, walking) on the basis of detection results obtained by an acceleration sensor and an angular velocity sensor included in the information processing devices 30a and 30b.

Further, one or more of the information processing devices 30 may be carried while being stored in possessions of the user such as a bag. For example, the information processing device 30c shows an example of the information processing device 30 that is carried together with a bag u11 by the user u1 while being stored in the bag u11 possessed by the user u1.

Further, one or more of the information processing devices 30 do not necessarily need to be carried by the user. As a specific example, the information processing device 30d shows an example of the information processing device 30 configured as a so-called sensor device placed on a predetermined place to sense information determined in advance. In the example shown in FIG. 1, the information processing device 30d is configured as, for example, a motion sensor and, when the information processing device 30d is placed in the entrance, the information processing device 30d can detect the user u1 who moves to the entrance.

Further, as another example, the information processing device 10 may indirectly estimate various states such as behavior of the user, a state of the user, and a surrounding environment (external environment) on the basis of data registered in advance. For example, the information processing device 10 may refer to data indicating a schedule of the user u1 registered in advance and estimate behavior of the user u1 on the basis of the schedule. As a specific example, in the example shown in FIG. 1, the information processing device 10 may estimate behavior in which the user u1 moves to the outside on the basis of data indicating the user u1's plan to go out.

On the basis of the above configuration, the information processing device 10 can recognize various states such as behavior of the user, a state of the user, and a surrounding environment (external environment).

Then, when the information processing device 10 transitions to the carry mode on the basis of a recognition result of the various states, the information processing device 10 drives the drive unit 17 to move to a position determined in advance to cause the user to carry the information processing device 10 and is held in the position. For example, in the example shown in FIG. 1, when the information processing device 10 transitions from the stand-by mode to the carry mode, the information processing device 10 detects a position p11 set in the vicinity of a shoulder of the user, moves to the position p11, lands on the position p11, and is held therein.

Note that, as long as the information processing device 10 can detect the position p11 determined in advance, a method thereof is not particularly limited. For example, the information processing device 10 may detect a position of the user u1 on the basis of position information of the information processing device 30 (for example, the information processing devices 30a to 30c) carried by the user, the position information being detected by the information processing device 30. Further, as another example, the information processing device 10 may recognize that, for example, on the basis of a detection result of the user u1 obtained by the information processing device 30 placed in a specified area such as the entrance, the user u1 positions in the area.

Further, the information processing device 10 may recognize the user u1 on the basis of an image captured by the imaging unit 14. Further, at this time, for example, the information processing device 10 may analyze the captured image, detect a predetermined shape characteristic on the basis of an analysis result, and therefore recognize a position of a predetermined part (for example, shoulder) of the user u1, thereby detecting the position p11 set on the part on the basis of the recognition result.

Further, when a device for carrying the information processing device 10 is held (placed) in the position p11 in advance, the information processing device 10 may detect the position p11 on the basis of a result of communication with the device. As a specific example, when a device that transmits a predetermined electric wave (or electromagnetic wave) for detecting a position, such as a beacon, is held in the position p11, the information processing device 10 can detect the position p11 on the basis of an electric wave from the device. Further, a so-called marker for allowing the information processing device 10 to detect the position p11 may be provided at the position p11.

Note that a configuration or method for holding the information processing device 10 in the position p11 is not particularly limited. As a specific example, a mechanism for grabbing an object close to the information processing device 10 may be provided in the information processing device 10. With this, the information processing device 10 itself may be held in the position p11 by controlling the mechanism so that the mechanism grabs a part of the user u1 (for example, shoulder) corresponding to the position p11.

Further, as another example, a member for fixing the information processing device 10 may be provided at the position p11 and an engagement portion for engaging with the member may be provided in the information processing device 10. With this configuration, the information processing device 10 itself may be held in the position p11 by engaging the engagement portion provided in the information processing device 10 itself with the member provided at the position p11.

As described above, in a case where the information processing device 10 transitions to the carry mode in accordance with detection of a state that satisfies a predetermined condition (for example, behavior in which the user u1 moves to the outside) among various states, the information processing device 10 moves to the position p11 set in advance to cause the user u1 to carry the information processing device 10 and is held in the position p11.

As described above, in the carry mode, the information processing device 10 is carried by the user u1 while being held in the predetermined position p11. That is, after the information processing device 10 transitions to the carry mode (that is, after the information processing device 10 is held in the position p11), the information processing device 10 moves together with the user u1 without moving by driving the drive unit 17. Therefore, for example, the information processing device 10 does not need to constantly drive the drive unit 17, unlike a case where the information processing device 10 operates the drive unit 17 so as to move to follow movement of the user u1 by driving the drive unit 17. Thus, it is possible to reduce power consumption caused by driving the drive unit 17.

Further, in the example shown in FIG. 2, in a case where the information processing device 10 detects that the user u1 who carries the information processing device 10 itself returns home from the outside, the information processing device 10 transitions to the stand-by mode. When the information processing device 10 transitions to the stand-by mode, the information processing device 10 separates from the position p11 in which the information processing device 10 is held, moves to a position that satisfies a condition determined in advance for standing by, and is held in the position (or stands by at the position) by driving the drive unit 17. For example, in the example shown in FIG. 2, when the user u1 returns home from the outside and the information processing device 10 transitions from the carry mode to the stand-by mode, the information processing device 10 detects the charging stand 70, moves to the charging stand 70, lands on the charging stand 70, and is held therein.

As described above, in a case where the information processing device 10 transitions to the stand-by mode in accordance with detection of a state that satisfies a predetermined condition (for example, behavior in which the user u1 moves to the outside) among various states, the information processing device 10 moves to a position that satisfies a predetermined condition (that is, position for standing by) and is held in the position.

Further, the information processing device 10 may separate from the user u1 and move by driving the drive unit 17.

As a specific example, the information processing device 10 may autonomously move by driving the drive unit 17 on the basis of an instruction from the user u1 or a surrounding state recognized on the basis of the imaging unit 14 or the various sensors. Further, as another example, the information processing device 10 may move by driving the drive unit 17 in response to operation via an operation device (for example, remote controller) performed by the user u1. In such a case, a mode in which the information processing device 10 moves in a state in which the information processing device 10 is being separated from the user u1 may be set as the operation mode of the information processing device 10. Note that, hereinafter, the operation mode in which the information processing device 10 moves in a state in which the information processing device 10 is separated from the user u1 by driving the drive unit 17 will be described as "drive mode" in some cases.

That is, in a case where the information processing device 10 detects a state that satisfies a predetermined condition among various states, the information processing device 10 may switch the operation mode of the own device to any one of the carry mode, the stand-by mode, and the drive mode in accordance with the detected state and operate in accordance with the operation mode. Note that the carry mode corresponds to an example of "carry state". Further, the stand-by mode and the drive mode correspond to examples of "non-carry state".

As described above, the information processing device 10 according to the present embodiment determines a state or situation in which the user u1 needs to carry the information processing device 10 itself on the basis of recognized various states and automatically operates in accordance with the determination result so as to realize a state in which the information processing device 10 itself is carried by the user u1. With this, the user u1 does not need to be explicitly conscious of operation of recognizing a change in various states (for example, a change in behavior or a state of the user u1 himself/herself) and carrying the information processing device 10, and therefore it is also possible to prevent a situation in which the user u1 forgets to carry the information processing device 10 when, for example, the user u1 goes out.

Further, the information processing device 10 according to the present embodiment may determine a state or situation in which the user u1 does not need to carry the information processing device 10 itself (or it is desirable not to carry the information processing device 10 itself) and may automatically separate from the user u1 in accordance with the determination result. With this, the user u1 does not need to be explicitly conscious of bothering operation in which the user u1 himself/herself recognizes a change in various states (for example, a change in surrounding environment) and removes the information processing device 10.

That is, the information processing device 10 according to the present embodiment switches a state in which the information processing device 10 itself is carried and a state in which the information processing device 10 itself is not carried in accordance with a state or situation in which the information processing device 10 itself is used (that is, various states such as behavior of the user, a state of the user, and a surrounding environment (external environment)), without the user performing explicit operation (that is, automatically). With this configuration, in a situation in which the information processing device 10 may be used, the user can carry the information processing device 10 in a more suitable form, without being explicitly conscious of whether or not it is necessary to carry the information processing device 10.

Hereinabove, the outline of the system to which the information processing device 10 according to the present embodiment is applied is described with reference to FIG. 1 and FIG. 2. Note that, hereinafter, the information processing device 10 according to the present embodiment will be described in more detail.

2. FUNCTIONAL CONFIGURATION

Figure 3:
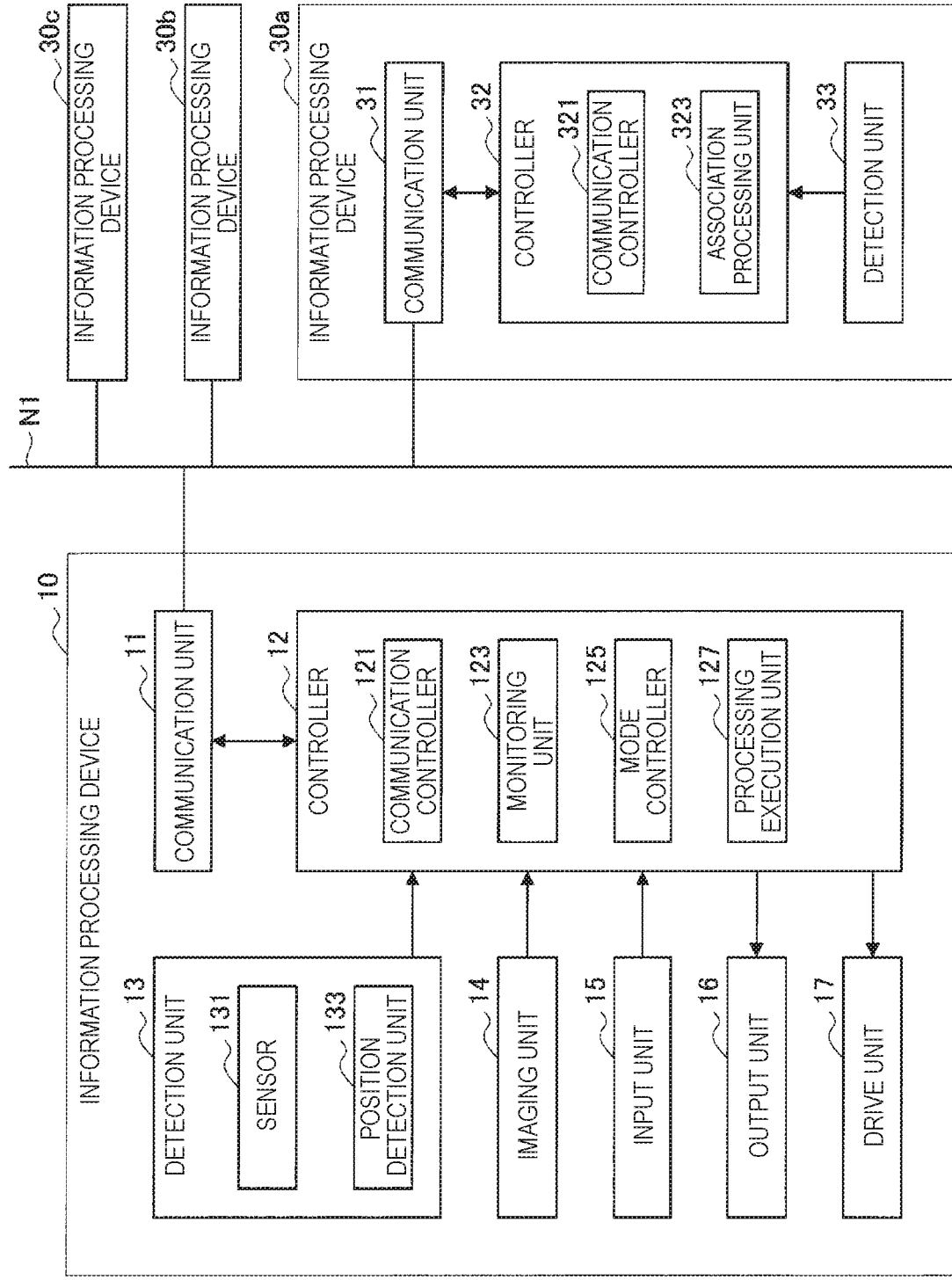
FIG. 3 is a block diagram showing an example of a functional configuration of the system to which the information processing device according to this embodiment is applied.

Next, an example of a functional configuration of the system to which the information processing device 10 according to the present embodiment is applied, in particular, an example of functional configurations of the information processing devices 10 and 30 will be described with reference to FIG. 3. FIG. 3 is a block diagram showing an example of the functional configuration of the system to which the information processing device 10 according to the present embodiment is applied. Note that FIG. 3 shows an example where the information processing devices 30a to 30c serving as the information processing devices 30 operate while being associated with the information processing device 10. In view of this, in the present description, in a case where the information processing devices 30a to 30c are not differentiated in particular, the information processing devices 30a to 30c will be simply described as "information processing devices 30" in some cases.

As shown in FIG. 3, when the information processing device 10 and the information processing devices 30a to 30c are connected via a network N1, the information processing device 10 and the information processing devices 30a to 30c can operate while being associated with each other on the basis of communication via the network N1.

Note that a type of the network N1 is not particularly limited as long as the information processing device 10 and the information processing devices 30a to 30c can operate while being associated with each other (for example, the devices can transmit/receive various kinds of information to/from each other). As a specific example, the network N1 may be configured as a wired or wireless network. The wireless network is, for example, a network based on a communication standard such as Bluetooth (registered trademark) or wireless fidelity (Wi-Fi) (registered trademark). Further, the network N1 may include a plurality of networks and may include both a wireless network and a wired network. Further, the network N1 may be the so-called Internet or may be a home network, an intracompany network, an in-vehicle network, or the like (for example, a local area network (LAN) or a wide area network (WAN)).

Further, in order to establish the network N1 between the information processing device 10 and the information processing devices 30a to 30c, there may be used a technique of autonomously performing routing between devices close to each other, such as a so-called ad hoc network, without depending on basic equipment such as base stations and a fixed network connecting the base stations. When the network N1 is established between the information processing device 10 and the information processing devices 30a to 30c by using the ad hoc network, it is possible to perform dynamic control such as participation of a new information processing device 30 in the network N1 and separation of an information processing device 30 from the network N1.

(Information Processing Device 10)

Herein, the functional configuration of the information processing device 10 will be described. As shown in FIG. 3, the information processing device 10 includes a communication unit 11, a controller 12, and the drive unit 17. Further, the information processing device 10 may include at least any one of a detection unit 13, the imaging unit 14, an input unit 15, and an output unit 16.

The communication unit 11 is an interface through which each configuration of the information processing device 10 (for example, each configuration of the controller 12) transmits/receives information to/from the information processing devices 30 connected via the network N1. Note that, as described above, a form of the network N1 is not particularly limited as long as the information processing device 10 and the information processing devices 30 can transmit/receive information to/from each other. Further, in the following description, in a case where each configuration of the information processing device 10 transmits/receives information to/from the information processing devices 30 via the network N1, the information is transmitted/received via the communication unit 11 even in a case where particular description is not provided.

The detection unit 13 can include a configuration that acquires various kinds of information for recognizing at least one of a state of the information processing device 10, an external environment of the information processing device 10, and a state (or behavior) of the user u1 who uses the information processing device 10. As a specific example, in an example shown in FIG. 3, the detection unit 13 includes a sensor 131 and a position detection unit 133.

The sensor 131 can include, for example, a configuration that acquires information for recognizing the state of the information processing device 10, such as a sensor capable of detecting a change in a position or orientation of a predetermined housing (for example, a housing of the information processing device 10), which encompasses, for example, an acceleration sensor and an angular velocity sensor. Further, the sensor 131 may include, for example, a configuration that acquires information for recognizing the state of the user u1, such as a temperature sensor for measuring a body temperature of the user u1 or a pulse wave sensor for detecting a heartbeat or pulse. Further, the sensor 131 may include a configuration that acquires information for recognizing a state of the external environment of the information processing device 10 (eventually, an external environment of the user u1), such as an air temperature sensor and a barometric sensor.

The position detection unit 133 is a configuration for acquiring position information indicating a position of the information processing device 10. Note that an example of a technique for acquiring position information is, for example, a global positioning system (GPS).

Further, a configuration included in the detection unit 13 described above (for example, the sensor 131 and the position detection unit 133) is merely an example. That is, the configuration included in the detection unit 13 or a method of acquiring information with the configuration is not particularly limited as long as information for detecting at least one of the state of the information processing device 10, the external environment of the information processing device 10, and the state of the user u1 who uses the information processing device 10 can be acquired.

As a specific example, the detection unit 13 may include a sound collection device (for example, microphone) for collecting an environmental sound outside the information processing device 10.

Then, the detection unit 13 outputs detected information to a monitoring unit 123 described below. With this, the monitoring unit 123 can recognize various states, such as the state of the information processing device 10, the external environment of the information processing device 10 (eventually, the external environment of the user u1), and the state (or behavior) of the user u1 who uses the information processing device 10, on the basis of various kinds of information acquired from the detection unit 13.

The imaging unit 14 includes an imaging element such as a complementary metal-oxide semiconductor (CMOS) image sensor or a charge coupled device (CCD) image sensor and an optical system such as a lens and is a configuration for capturing an image of a subject. The imaging unit 14 may output the captured image to the monitoring unit 123. With this, the monitoring unit 123 can recognize, for example, the various states such as the external environment of the information processing device 10 and the state of the user u1 in an imaging area on the basis of the image acquired from the imaging unit 14.

The input unit 15 is a configuration through which the user u1 inputs various kinds of information to the information processing device 10. A specific example of the input unit 15 is an input device such as a button or a switch.

Further, the input unit 15 may accept voice input from the user u1. In this case, for example, the input unit 15 only needs to be configured as a sound collection device for collecting voice uttered from the user u1, such as a microphone.

In a case where the input unit 15 accepts input from the user u1, the input unit 15 may output information indicating the content of the input to the controller 12 described below.

The output unit 16 is a configuration for notifying the user of information. The output unit 16 can include, for example, a display unit for presenting information serving as a notification target as a video information (for example, letter, still image, or moving image). The display unit can be configured as, for example, a liquid crystal display (LCD) device or an organic light emitting diode (OLED) display.

Further, the output unit 16 can include a sound output unit for outputting information serving as a notification target as sound information such as voice. The sound output unit can be configured as, for example, a speaker.

Note that the examples of the output unit 16 described above are merely examples, and the configuration of the output unit 16 or a method in which the output unit 16 notifies the user u1 of information is not particularly limited as long as the user u1 can be notified of predetermined information.

For example, the output unit 16 may be configured as a real object (for example, an indicator such as an arrow) capable of controlling a position and an orientation by driving the drive unit. As a specific example, the output unit 16 may present a direction to the user u1 by controlling the orientation of the real object formed as the indicator such as an arrow.

Further, as another example, the output unit 16 may include a light source and notify the user u1 of predetermined information by using light emitted from the light source. As a specific example, the output unit 16 may present a direction to the user u1 by emitting visible light (for example, laser light) having directionality in a desired direction.

Note that FIG. 3 shows an example where the detection unit 13, the imaging unit 14, the input unit 15, and the output unit 16 are included in the information processing device 10. However, the present embodiment is not necessarily limited to the configuration shown in FIG. 3. As a specific example, at least one of the detection unit 13 and the imaging unit 14 may be externally attached to the information processing device 10. Further, at least one of the input unit 15 and the output unit 16 do not need to be included in the information processing device 10. In this case, the information processing device 10 only needs to acquire input from the user u1 via another external device connected via a network and present information to the user u1 by, for example, transmitting/receiving information to/from the external device.

Further, the controller 12 includes a communication controller 121, the monitoring unit 123, a mode controller 125, and a processing execution unit 127.

The communication controller 121 is a configuration for controlling operation of the communication unit 11. The communication controller 121 executes a predetermined communication protocol with the information processing devices 30 connected via the network N1, thereby establishing communication with the information processing devices 30.

An example of the predetermined communication protocol is pairing processing based on Bluetooth (registered trademark) or processing for causing an access point (AP) and a station (ST) to recognize each other and establish communication on the basis of a Wi-Fi (registered trademark) standard. Further, the communication controller 121 may establish communication between the information processing device 10 and the information processing devices 30 in response to predetermined operation (for example, pushing a button) performed on any one of or both the information processing device 10 and the information processing devices 30, such as a so-called Wi-Fi protected setup-push button configuration (WPS-PBC).

Further, in a case where the communication controller 121 newly establishes communication with the information processing device 30, the communication controller 121 may notify a predetermined notification destination (for example, the monitoring unit 123 described below) of establishment of the communication. For example, when the communication controller 121 notifies the monitoring unit 123 of the establishment of the communication, the monitoring unit 123 can recognize that the information processing device 30 has been newly added as an association target.

Further, the communication controller 121 may monitor whether or not communication with the information processing devices 30 continues by regularly transmitting/receiving predetermined information to/from the information processing devices 30. Then, in a case where communication established with one or more of the information processing devices 30 is disconnected (for example, in a case where a period in which a response cannot be received continues for a predetermined period of time or more), the communication controller 121 may detect disconnection of the communication on the basis of a monitoring result and notify the monitoring unit 123 of a detection result.

With this configuration, in a case where communication with at least one of the information processing devices 30 among the information processing devices 30 serving as the association targets is disconnected, the monitoring unit 123 that has received the notification can recognize disconnection of the communication. In other words, the monitoring unit 123 can recognize that one or more of the information processing devices 10 are excluded from the association targets on the basis of the notification.

The monitoring unit 123 is a configuration for monitoring at least one state among a state of the information processing device 10, an external environment of the information processing device 10 (eventually, an external environment of the user u1), and a state (or behavior) of the user u1 who uses the information processing device 10.

The monitoring unit 123 may recognize the state of the user u1 or the behavior of the user u1 on the basis of a so-called behavior recognition technique by using, as input information, various kinds of information acquired from at least one of the configurations of the detection unit 13, the imaging unit 14, and the information processing device 30.

As a specific example, the monitoring unit 123 may recognize whether or not the user u1 is moving (for example, walking) on the basis of the behavior recognition technique by using, as input information, information detected by the acceleration sensor or angular velocity sensor included in the detection unit 13 or the information processing device 30. Further, at this time, the monitoring unit 123 may determine whether the user u1 is walking or running in accordance with a detection result of the acceleration sensor or angular velocity sensor (in accordance with, for example, a direction of vibration or period of vibration).

Further, in a case where, unless the user u1 himself/herself is not moving, it is detected that the user u1 is moving on the basis of position information (for example, position information of the information processing device 10 or 30) detected by a GPS or the like, the monitoring unit 123 may recognize that the user u1 is moving by vehicle, train, or the like. Further, in this case, the monitoring unit 123 may recognize a moving path of the user u1 on the basis of the position information detected by the GPS or the like and recognize (or estimate) moving means (that is, any one of vehicle and train) of the user u1 on the basis of the recognized moving path. As described above, the monitoring unit 123 may recognize (or estimate) the behavior or state of the user in accordance with information detected by a predetermined detection device such as a GPS (in other words, information that is not explicitly input by the user).

Further, the monitoring unit 123 may recognize the external environment of the information processing device 10 (in other words, the external environment of the user u1 who uses the information processing device 10) on the basis of various kinds of information acquired by at least one of the detection unit 13, the imaging unit 14, and the information processing device 30.

As a specific example, the monitoring unit 123 can recognize an environment in which the user u1 positions (for example, home or company) on the basis of the position information detected by the GPS or the like. Further, the monitoring unit 123 may recognize a position of a home or company of the user u1 on the basis of a history of the position information of the user u1 in a specified period of time. As a specific example, on the basis of a history of the position information of the user u1 at night, the monitoring unit 123 may recognize a position having the highest frequency of existence of the user u1 as the position of the home of the user u1. Similarly, on the basis of a history of the position information of the user u1 in the daytime on weekdays, the monitoring unit 123 may recognize a position having the highest frequency of existence of the user u1 as the position of the company of the user u1.

Further, as another example, the monitoring unit 123 may estimate a climate or weather around the user on the basis of information such as an air temperature, a temperature, and a barometric pressure detected by various sensors (for example, the sensor 131).

Further, the monitoring unit 123 may recognize a state around the user on the basis of an environmental sound collected by the sound collection device (for example, microphone). As a specific example, the monitoring unit 123 may recognize density of people around the user on the basis of a level (volume) or signal-to-noise ratio (SN ratio) of the environmental sound collected by the sound collection device. Further, as another example, the monitoring unit 123 may recognize whether or not an environment around the user is an environment in which the user is required to behave silently (is a so-called quiet environment) on the basis of the level (volume) or SN ratio of the environmental sound collected by the sound collection device (for example, microphone).

Further, when the monitoring unit 123 accesses an external server, the monitoring unit 123 may acquire and use information detected by another information processing device 10 (or the information processing devices 30 associated with the information processing device 10) via the server. As a specific example, the monitoring unit 123 may acquire position information of other users from the external server and therefore recognize whether or not people are concentrated in the vicinity of a position of the user u1 recognized on the basis of a detection result obtained by the GPS (in other words, may recognize density of people).

Further, as another example, on the basis of recognized position information of the user u1, the monitoring unit 123 may acquire information on weather in an area in which the user positions (that is, an area including the recognized position information) from the external server.

Further, the monitoring unit 123 may monitor operation and various kinds of information (for example, various parameters) of the information processing device 10 and recognize the state of the information processing device 10 on the basis of a monitoring result. In particular, among states of the information processing device 10, the monitoring unit 123 may set a state that changes in accordance with a use situation of the user as a monitoring target. As a specific example, the monitoring unit 123 may monitor a remaining quantity of a battery of the information processing device 10 and recognize whether or not the information processing device 10 is being driven by the battery on the basis of the monitoring result.

Further, the monitoring unit 123 may recognize a predetermined state by combining a recognition result of the state of the information processing device 10, such as a result of recognizing whether or not the battery is being charged, with another information. As a specific example, the monitoring unit 123 may record a history of the position information of the information processing device 10 obtained in a case where the battery is being charged and recognize a position having a high charging frequency as the home of the user u1 on the basis of the history.

Further, the monitoring unit 123 may recognize a use state of the information processing device 30 (that is, whether or not the user uses the information processing device 30). As a specific example, regarding the information processing device 30 that is temporarily stopped, i.e., is in a so-called sleep mode, the monitoring unit 123 may recognize that the information processing device 30 is not used by the user.

Further, regarding the information processing device 30 such as a so-called wearable device, in a case where the monitoring unit 123 can detect a wearing state, the monitoring unit 123 may recognize whether or not the information processing device 30 is by the user in accordance with the wearing state. That is, in a case where the user wears the information processing device 30 configured as a wearable device, the monitoring unit 123 may recognize that the information processing device 30 is used by the user.

Further, the monitoring unit 123 may recognize a state desired by the user on the basis of an explicit instruction from the user. As a specific example, in a case where the user calls the information processing device 10 by voice input, the monitoring unit 123 may recognize that the user needs the information processing device 10 (that is, the user attempts to carry the information processing device 10).

As described above, the monitoring unit 123 monitors various states such as the state of the information processing device 10, the external environment of the information processing device 10 (eventually, the external environment of the user u1), and the state (or behavior) of the user u1 who uses the information processing device 10.

Then, the monitoring unit 123 notifies the mode controller 125 described below of a monitoring result of the various states. With this, the mode controller 125 can control the operation mode of the information processing device 10 in accordance with the monitoring result of the various states transmitted as notification from the monitoring unit 123. Further, the monitoring unit 123 may notify the processing execution unit 127 described below of the monitoring result of the various states. With this, the processing execution unit 127 can recognize the various states on the basis of the notification from the monitoring unit 123. Note that the monitoring result transmitted as the notification from the monitoring unit 123 to the mode controller 125, that is, the various states such as the behavior of the user, the state of the user, and the surrounding environment (external environment) correspond to examples of "information on a user".

Figure 4:
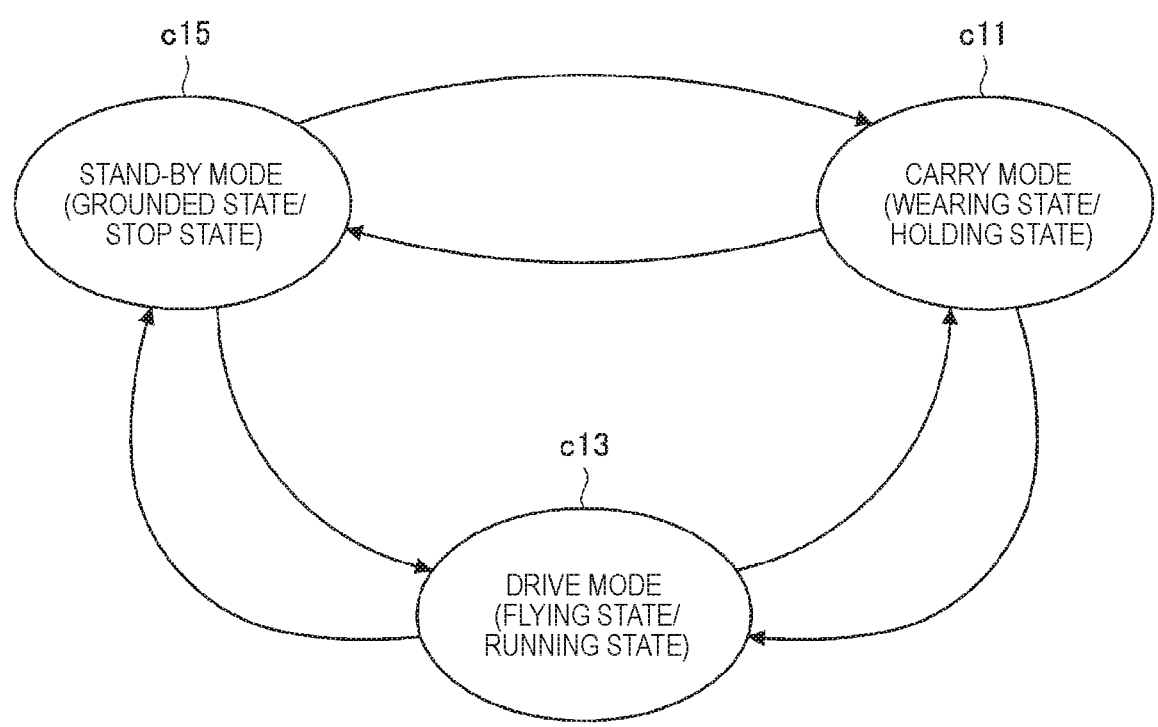
FIG. 4 is a schematic state transition diagram showing an example of a relationship among various operation modes of the information processing device according to this embodiment.

Upon receipt of notification of the monitoring result from the monitoring unit 123, the mode controller 125 controls the operation mode of the information processing device 10 in accordance with various states transmitted as the notification. For example, FIG. 4 is a schematic state transition diagram showing an example of a relationship among various operation modes of the information processing device 10 according to the present embodiment. As an example of the relationship among the various operation modes of the information processing device 10, the example shown in FIG. 4 shows an example of a relationship among a carry mode c11, a drive mode c13, and a stand-by mode c15.

The carry mode c11 shows an operation mode in which the user carries the information processing device 10. In a case where the mode controller 125 recognizes that a state in which the information processing device 10 is carried by the user is desirable on the basis of a monitoring result transmitted as notification from the monitoring unit 123, the mode controller 125 causes the operation mode of the information processing device 10 to transition to the carry mode c11.

As a specific example, in a case where the mode controller 125 recognizes behavior in which the user leaves home, the mode controller 125 causes the operation mode of the information processing device 10 to transition to the carry mode c11 so as to realize a state in which the information processing device 10 is carried by the user.

Further, as another example, in a case where the mode controller 125 recognizes that the user desires to carry the information processing device 10 on the basis of an explicit instruction from the user (for example, voice input by the user), the mode controller 125 may cause the operation mode of the information processing device 10 to transition to the carry mode c11.

When the information processing device 10 transitions to the carry mode c11, the information processing device 10 moves to a position determined in advance to cause the user to carry the information processing device 10, such as a part of the body (body part) of the user, and is held in the position as described above with reference to, for example, FIG. 1.

The drive mode c13 is an operation mode in which the information processing device 10 moves by driving the drive unit 17. In a case where the mode controller 125 recognizes that a state in which the information processing device 10 separates from the user and moves by driving the drive unit 17 is desirable on the basis of a monitoring result transmitted as the notification from the monitoring unit 123, the mode controller 125 causes the operation mode of the information processing device 10 to transition to the drive mode c13.

As a specific example, in a case where the mode controller 125 recognizes that the body of the user is largely vibrated as in the case of running and therefore it is difficult to hold the information processing device 10 in a part of the body of the user, the mode controller 125 may cause the operation mode of the information processing device 10 to transition to the drive mode c13. In this case, for example, the information processing device 10 may temporarily separate from the user and move to follow the user by driving the drive unit 17.

Note that, in a case where the information processing device 10 transitions to the drive mode c13, the information processing device 10 may autonomously move on the basis of, for example, an instruction from the user acquired in advance or a recognized surrounding state. Further, as another example, the information processing device 10 may be controlled to move on the basis of operation from the user via the operation device.

The stand-by mode c15 is a mode in which the information processing device 10 separates from the user and stands by at a position that satisfies a predetermined condition (in other words, is held in the position). In a case where the mode controller 125 recognizes that a state in which the information processing device 10 separates from the user (that is, in a state in which the information processing device 10 is not carried by the user) and stands by at another position is desirable on the basis of the monitoring result transmitted as the notification from the monitoring unit 123, the mode controller 125 causes the operation mode of the information processing device 10 to transition to the stand-by mode c15.

As a specific example, in a case where the mode controller 125 recognizes that the user who carries the information processing device 10 returns home, the mode controller 125 causes the operation mode of the information processing device 10 to transition to the stand-by mode c15.

In a case where the information processing device 10 transitions to the stand-by mode c15, the information processing device 10 detects a position that satisfies a condition in which the information processing device 10 itself can stand by, moves to the detected position, and stands by thereat. As a specific example, the information processing device 10 detects a charging stand for charging a battery, moves to the charging stand, and stands by thereat. Further, as another example, the information processing device 10 may detect a position, which is different from a position at which the user carries the information processing device 10 (for example, a part of the body of the user) and satisfies a condition in which the information processing device 10 can temporarily stand by (a flat position such as a position on a top of a table), move to the position, and stand by thereat.

Note that the mode controller 125 only needs to recognize a corresponding relationship between various states transmitted as the notification from the monitoring unit 123 and various operation modes of the information processing device 10 on the basis of, for example, data generated in advance (for example, lookup table). Note that a location in which the data is stored is not particularly limited as long as the mode controller 125 can read out the data. As a specific example, data indicating the corresponding relationship between the various states and the various operation modes may be stored in advance on a storage unit in the information processing device 10. Further, as another example, the data may be stored on an external device different from the information processing device 10, such as a server. In this case, the information processing device 10 only needs to establish communication with the external device and acquire the data stored on the external device via the communication.

Then, the mode controller 125 causes the processing execution unit 127 to execute a function (for example, application) in accordance with the operation mode after control in accordance with a control result of the operation mode of the information processing device 10.

Further, whether or not the information processing device 10 can transition to an operation mode specified as a transition destination on the basis of one or more of various states transmitted as the notification from the monitoring unit 123 may be determined by the mode controller 125 on the basis of another one of the various states transmitted as the notification.

As a specific example, the mode controller 125 is assumed to specify the carry mode c11 as the operation mode serving as the transition destination on the basis of a detection result of behavior in which the user moves to the outside, the detection result being transmitted as the notification from the monitoring unit 123. At this time, the mode controller 125 may determine whether or not the information processing device 10 can move to a position at which the user exists (for example, entrance) on the basis of another state transmitted as the notification from the monitoring unit 123 and determine whether or not the information processing device 10 can transition to the carry mode c11 on the basis of the determination result. For example, in a case where the mode controller 125 recognizes that the remaining quantity of the battery of the information processing device 10 is small, the mode controller 125 may recognize that it is difficult for the information processing device 10 to move to the position at which the user exists and, as a result, may determine that it is difficult to transition to the carry mode c11.

Further, in a case where the mode controller 125 determines that it is difficult to transition to an operation mode specified as the transition destination, the mode controller 125 may stop control regarding the transition to the specified operation mode. Further, at this time, the mode controller 125 may inform the user that the transition to the specified operation mode is stopped (in other words, it is difficult to transition to the specified operation mode) via the output unit 16.

The processing execution unit 127 is a configuration for executing various functions of the information processing device 10. Upon receipt of an instruction from the mode controller 125, the processing execution unit 127 executes a function corresponding to the instruction. Note that, at this time, the processing execution unit 127 may control operation of at least one of the detection unit 13, the imaging unit 14, the output unit 16, and the drive unit 17 in accordance with execution of the function corresponding to the instruction from the mode controller 125. Further, at this time, the processing execution unit 127 may acquire a monitoring result of various states from the monitoring unit 123. With this, the processing execution unit 127 can also recognize various states on the basis of a monitoring result transmitted as the notification from the monitoring unit 123 and control operation of at least one of the detection unit 13, the imaging unit 14, the output unit 16, and the drive unit 17 in accordance with the recognized states.

As a specific example, the operation mode of the information processing device 10 is assumed to transition from the stand-by mode c15 to the carry mode c11. In this case, the processing execution unit 127 moves the information processing device 10 to the position p11 set to cause the user u1 to carry the information processing device 10 by, for example, controlling operation of the imaging unit 14 and the drive unit 17.

Specifically, the processing execution unit 127 causes the imaging unit 14 to capture an image of surroundings of the information processing device 10 and acquires, from the monitoring unit 123, a monitoring result (in other words, detection result) of the state of the user u1 (for example, a position of the user u1) based on the image. Further, at this time, the processing execution unit 127 may acquire, from the monitoring unit 123, the monitoring result of the state of the user u1 based on a detection result obtained by the detection unit 13 or a detection result obtained by a detection unit 33 of the information processing device 30. Then, the processing execution unit 127 detects the position p11 on the basis of the monitoring result of the state of the user u1 acquired from the monitoring unit 123 and moves the information processing device 10 to the detected position p11 by driving the drive unit 17.

Further, as another example, the operation mode of the information processing device 10 is assumed to transition from the carry mode c11 to the stand-by mode c15. In this case, the processing execution unit 127 detects a position that satisfies a predetermined condition in which the information processing device 10 stands by (for example, the charging stand 70) and moves the information processing device 10 to the position by, for example, controlling operation of the imaging unit 14 and the drive unit 17.

Further, as another example, the operation mode of the information processing device 10 is assumed to transition from the carry mode c11 to the drive mode c13. In this case, the processing execution unit 127 separates the information processing device 10 from the user and causes the information processing device 10 to transition to a movable state by controlling operation of the drive unit 17 and thereafter controls operation regarding movement of the information processing device 10.

Note that, at this time, how the processing execution unit 127 moves the information processing device 10 (that is, the content of control of the operation regarding the movement of the information processing device 10) is not particularly limited. As a specific example, the processing execution unit 127 may determine the content of the control of the operation regarding the movement of the information processing device 10 on the basis of, for example, an instruction from the user such as voice input. Further, as another example, the processing execution unit 127 may recognize various states (for example, a state of the user, a state of the information processing device 10, and an environment around the information processing device 10) on the basis of a monitoring result transmitted as the notification from the monitoring unit 123 and control operation of the information processing device 10 in accordance with a recognition result.

(Information Processing Device 30)

Next, the functional configuration of the information processing device 30 will be described. The information processing device 30 includes a communication unit 31, a controller 32, and the detection unit 33.

The communication unit 31 is an interface through which each configuration of the information processing device 30 (for example, each configuration of the controller 32) transmits/receives information to/from another information processing device (for example, the information processing device 10 or another information processing device 30) connected via the network N1. Note that, as described above, the form of the network N1 is not particularly limited as long as the information processing device 30 and another information processing device can transmit/receive information to/from each other. Further, in the following description, in a case where each configuration of the information processing device 30 transmits/receives information to/from the another information processing device via the network N1, the information is transmitted/received via the communication unit 31 even in a case where particular description is not provided.

The detection unit 33 can include a configuration that acquires various kinds of information for recognizing at least one of a state of the information processing device 30, an external environment of the information processing device 30, and a state of the user u1 who uses the information processing device 30. As a specific example, the detection unit 33, as well as the detection unit 13 of the information processing device 10 described above, may include at least one of the sensor 131 and the position detection unit 133.

The controller 32 includes a communication controller 321 and an association processing unit 323.

The communication controller 321 is a configuration for controlling operation of the communication unit 31. The communication controller 321 executes a predetermined communication protocol with an external information processing device 10 connected via the network N1, thereby establishing communication with the external information processing device.

The association processing unit 323 operates on the basis of an instruction from the external information processing device 10. Specifically, the association processing unit 323 transmits information acquired by the detection unit 33 to the information processing device 10 in response to the instruction from the external information processing device 10.

Note that the functional configurations of the information processing devices 10 and 30 described above are merely examples and are not necessarily limited to the above configurations. As a specific example, at least a part of the configuration of the controller 12 (for example, one or more of the monitoring unit 123, the mode controller 125, and the processing execution unit 127) may be provided on the outside of the information processing device 10 (for example, server). In such a case, for example, at least a part of the configuration of the controller 12 may be provided in a terminal carried by the user u1 and the terminal may control operation of the information processing device 10 via wireless communication.

Hereinabove, an example of the functional configuration of the system to which the information processing device 10 according to the present embodiment is applied, in particular, an example of the functional configurations of the information processing devices 10 and 30 has been described with reference to FIG. 3 and FIG. 4.

3. PROCESSING

Figure 5:
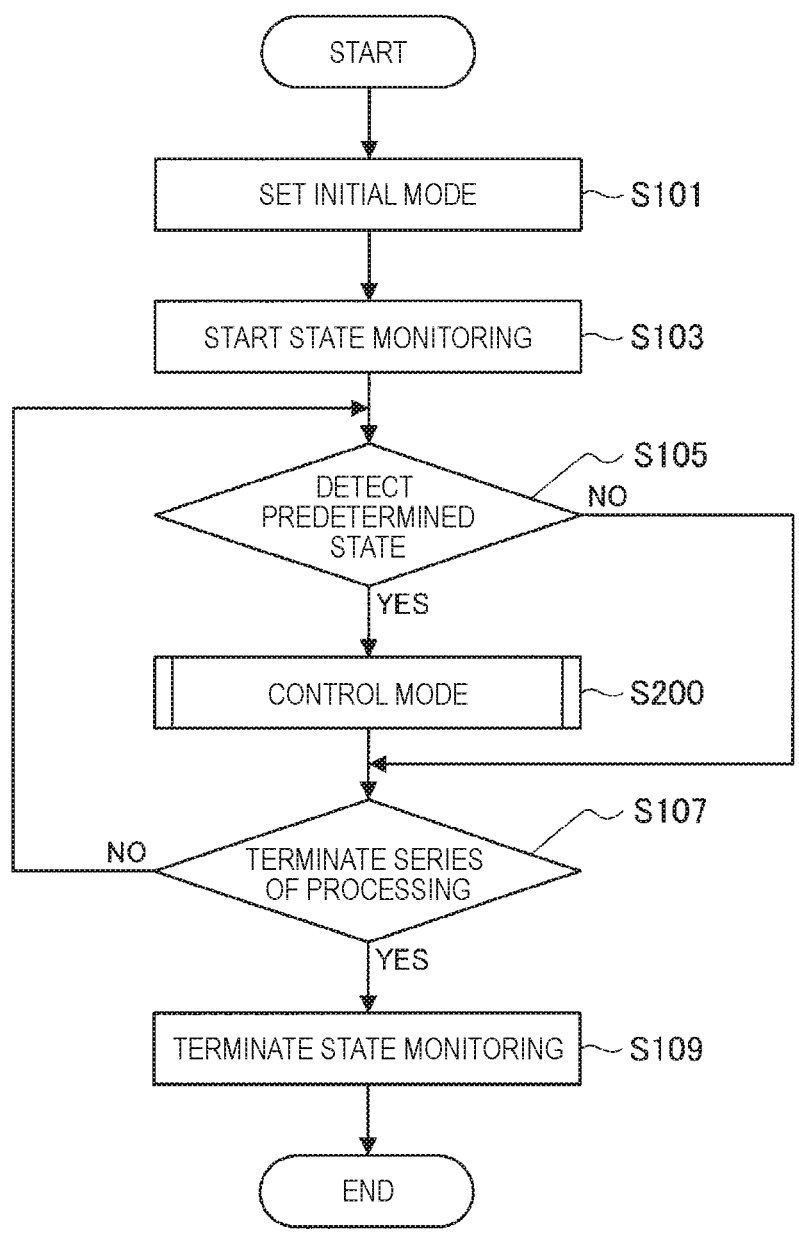
FIG. 5 is a flowchart showing an example of a series of operation of the information processing device according to the present embodiment.

Next, an example of a series of operation of the information processing device 10 according to the present embodiment, in particular, operation in which the information processing device 10 controls the operation mode and executes various functions in accordance with the operation mode will be described with reference to FIG. 5. FIG. 5 is a flowchart showing an example of the series of operation of the information processing device 10 according to the present embodiment.

(Step S101) When the information processing device 10 starts operation by, for example, turning on a power supply, the information processing device 10 first sets an operation mode in an initial state. At this time, the information processing device 10 may set the operation mode of the information processing device 10 itself to an operation mode determined in advance (for example, the stand-by mode c15). Further, an exclusive operation mode showing the initial state, which is different from the various operation modes shown in FIG. 4 (that is, the carry mode c11, the drive mode c13, and the stand-by mode c15), may be set.

(Step S103) When setting of the operation mode in the initial state is completed, the monitoring unit 123 of the information processing device 10 starts acquiring various kinds of information acquired by at least one of the configurations of the detection unit 13, the imaging unit 14, and another information processing device 30 from the one of the configurations. Note that, at this time, the information processing device 10 may establish communication with the another information processing device 30 and acquire the various kinds of information from the information processing device 30 via the communication.

Then, the monitoring unit 123 starts operation regarding monitoring of various states such as behavior of the user, a state of the user, and a surrounding environment (external environment) by using, as input information, the various kinds of information acquired by the one or more of the configurations of the detection unit 13, the imaging unit 14, and the another information processing device 30.

As a specific example, the monitoring unit 123 may recognize the state of the user and the behavior of the user on the basis of the so-called behavior recognition technique by using the acquired various kinds of information as the input information. Further, as another example, the monitoring unit 123 may recognize the external environment of the information processing device 10 (in other words, an external environment of the user who uses the information processing device 10) on the basis of the acquired various kinds of information. Further, at this time, the monitoring unit 123 may access an external server to monitor the various states by using information acquired from the server.

As described above, the monitoring unit 123 monitors the various states such as the state of the information processing device 10, the external environment of the information processing device 10 (eventually, the external environment of the user), and the state (or behavior) of the user who uses the information processing device 10. Then, the monitoring unit 123 notifies the mode controller 125 of a monitoring result of the various states.

(Step S200) In a case where the mode controller 125 detects a predetermined state on the basis of notification of the monitoring result from the monitoring unit 123 (Step S105, YES), the mode controller 125 controls the operation mode of the information processing device 10 in accordance with the detected state.

Figure 6:
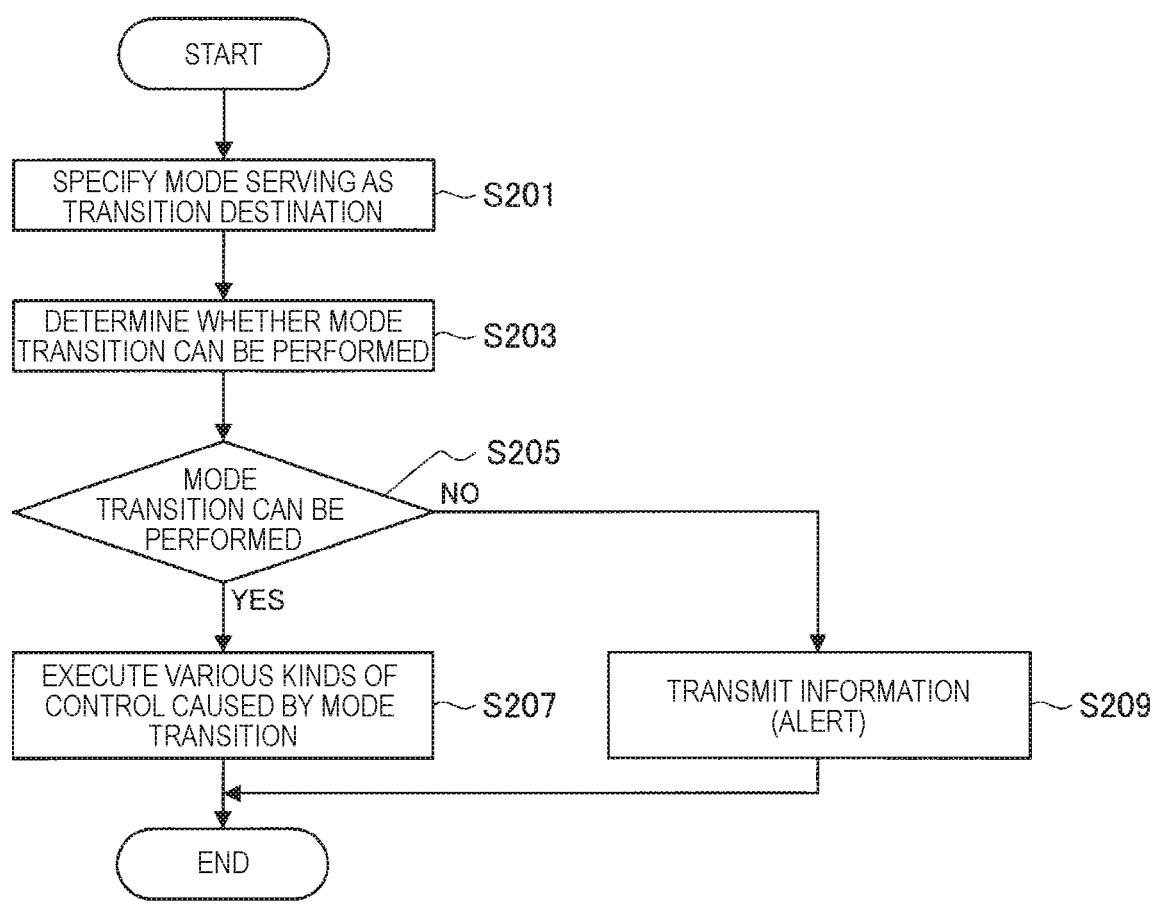
FIG. 6 is a flowchart showing an example of a series of operation of the information processing device according to the present embodiment.

Herein, an example of operation regarding mode control of the information processing device 10 will be described with reference to FIG. 6. FIG. 6 is a flowchart showing an example of the series of operation of the information processing device 10 according to the present embodiment and particularly shows an example of operation in which the information processing device 10 controls the operation mode and executes various functions in accordance with the operation mode.

(Step S201) The mode controller 125 specifies an operation mode serving as the transition destination by comparing, for example, data indicating the state transmitted as the notification from the monitoring unit 123 with a corresponding relationship between various states and various operation modes.

As a specific example, in a case where the mode controller 125 recognizes behavior in which the user moves to the outside on the basis of the notification of the monitoring result from the monitoring unit 123, the mode controller 125 specifies the carry mode c11 as the transition destination of the operation mode of the information processing device 10.

Further, as another example, in a case where the mode controller 125 recognizes that the user who carries the information processing device 10 returns home on the basis of the notification of the monitoring result from the monitoring unit 123, the mode controller 125 specifies the stand-by mode c15 as the transition destination of the operation mode of the information processing device 10.

(Step S203) When the operation mode serving as the transition destination is specified, the mode controller 125 may determine whether or not the information processing device 10 can transition to the operation mode specified as the transition destination on the basis of the notification of the monitoring result from the monitoring unit 123.

(Step S207) In a case where the mode controller 125 determines that it is difficult to transition to the operation mode specified as the transition destination (Step S203, NO), the mode controller 125 stops control regarding transition to the specified operation mode. Further, at this time, the mode controller 125 may inform the user that the transition to the specified operation mode is stopped (in other words, it is difficult to transition to the specified operation mode) via the output unit 16.

(Step S205) In a case where the mode controller 125 determines that the transition to the operation mode specified as the transition destination can be performed (Step S203, YES), the mode controller 125 causes the operation mode of the information processing device 10 to transition to the specified operation mode. Then, the mode controller 125 causes the processing execution unit 127 to execute a function (for example, application) in accordance with the operation mode after control in accordance with a control result of the operation mode of the information processing device 10. Upon receipt of an instruction from the mode controller 125, the processing execution unit 127 executes a function in accordance with the instruction.

As a specific example, the operation mode of the information processing device 10 is assumed to transition from the stand-by mode c15 to the carry mode c11. In this case, the processing execution unit 127 moves the information processing device 10 to the position p11 set to cause the user u1 to carry the information processing device 10 by, for example, controlling operation of the imaging unit 14 and the drive unit 17.

Further, as another example, the operation mode of the information processing device 10 is assumed to transition from the carry mode c11 to the stand-by mode c15. In this case, the processing execution unit 127 detects a position that satisfies a predetermined condition in which the information processing device 10 stands by (for example, the charging stand 70) and moves the information processing device 10 to the position by, for example, controlling operation of the imaging unit 14 and the drive unit 17.

Hereinabove, an example of the operation regarding the mode control of the information processing device 10 has been described with reference to FIG. 6. Note that, as shown in FIG. 5, it is needless to say that, unless a predetermined state is detected on the basis of the notification of the monitoring result from the monitoring unit 123 (Step S105, NO), the mode controller 125 and the processing execution unit 127 do not need to execute the series of operation that has been described with reference to FIG. 6.

(Step S107)

As described above, until an instruction to terminate the series of processing is performed, various states are continuously monitored by the monitoring unit 123, and the operation mode of the information processing device 10 is controlled by the mode controller 125 in accordance with the monitoring result (Step S107, NO).

(Step S109)

Then, when the monitoring unit 123 receives an instruction on termination of the processing, such as turning off the power supply, the monitoring unit 123 terminates operation regarding monitoring the various states (for example, operation regarding acquisition of information from the detection unit 13, the imaging unit 14, and the another information processing device 30 and recognition of the various states based on the acquired information).

Hereinabove, an example of the series of operation of the information processing device 10 according to the present embodiment, in particular, the operation in which the information processing device 10 controls the operation mode and executes various functions in accordance with the operation mode has been described with reference to FIG. 5 and FIG. 6.

4. MODIFICATION EXAMPLES

Next, modification examples of the system to which the information processing device 10 according to an embodiment of the present disclosure is applied will be described.

4.1. Modification Example 1

Example of Operation in Carry Mode

Figure 7:
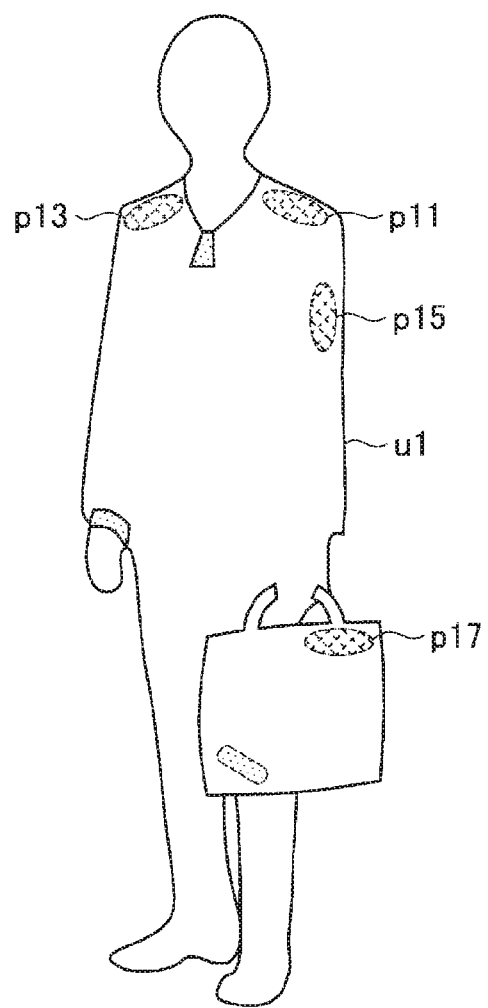
FIG. 7 is an explanatory view for describing an outline of operation of an information processing device according to Modification example 1.

First, as Modification example 1, an example of the operation of the information processing device 10 performed in a case where the information processing device 10 transitions to the carry mode c11 will be described with reference to FIG. 7. FIG. 7 is an explanatory view for describing an outline of the operation of the information processing device 10 according to Modification example 1.

In the embodiment described above, in a case where the information processing device 10 transitions to the carry mode c11, the information processing device 10 moves to the position p11 set in advance to cause the user u1 to carry the information processing device 10 and is held in the position p11 as shown in FIG. 1.

Meanwhile, in a case where the information processing device 10 transitions to the carry mode c11, a plurality of candidates for a position in which the information processing device 10 is held may be provided. For example, in an example shown in FIG. 7, positions p11 to p17 are set as the candidates for the position in which the information processing device 10 is held. Note that the candidates for the position in which the information processing device 10 is held may be set to parts of the body of the user u1, as denoted by the positions p11 to p15, and may be set to a part of a possession of the user u1, such as a bag, as denoted by the position p17. Note that, in a case where a candidate for the position in which the information processing device 10 is held is set to a part of the possession of the user u1, for example, a beacon or marker is placed on the possession and therefore the information processing device 10 only needs to recognize the beacon or marker as the candidate for the position in which the information processing device 10 itself is held.

As described above, in a case where the plurality of candidates for the position in which the information processing device 10 is held are set, the information processing device 10 may select a position in which the information processing device 10 itself is held from the positions p11 to p17 in accordance with various states such as recognized behavior of the user, a recognized state of the user, and a recognized surrounding environment (external environment). Specifically, a plurality of different modes are preferably set as the carry mode c11, and each mode and a state corresponding to the carry mode c11 among the various states are preferably associated in advance. With this, the information processing device 10 only needs to determine which mode among the plurality of modes set as the carry mode c11 the information processing device 10 transitions to in accordance with a recognized state.

As a more specific example, the information processing device 10 may determine a position in which the information processing device 10 itself is held in accordance with a recognized posture of a user. For example, FIG. 8 is an explanatory view for describing an outline of operation of the information processing device 10 according to Modification example 1 and shows an example where the information processing device 10 determines a position in which the information processing device 10 is held in accordance with a posture of a user.

Figure 8:
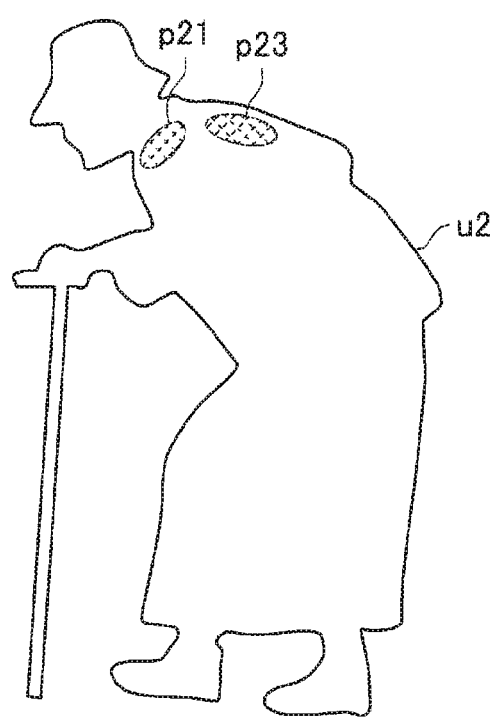
FIG. 8 is an explanatory view for describing an outline of operation of an information processing device according to Modification example 1.

In the example shown in FIG. 8, a posture of a user u2 is a state in which the user u2 bends over at the waist. With this posture, for example, in a case where the information processing device 10 is held in a position p21 set in the vicinity of a shoulder of the user u2, the information processing device 10 is held while being inclined with respect to a horizontal plane, which is not necessarily a stable state.

Therefore, as shown in FIG. 8, in a case where the information processing device 10 recognizes that the user u2 bends over at the waist, the information processing device 10 may determine, as a position in which the information processing device 10 itself is held, a position p23 set on a back of the user u2 as a position in which the information processing device 10 is held in a more horizontal state. That is, in such a case, it is only necessary to set a plurality of modes corresponding to postures of the user as the carry mode c11 and associate a position in which the information processing device 10 is held with each of the modes in advance.

Note that a position in which the information processing device 10 is held is preferably set in accordance with a mechanism for holding the information processing device 10 or a use purpose of the information processing device 10. As a specific example, when the information processing device 10 is held in a position close to a head part of the user, such as a part in the vicinity of a shoulder of the user, the information processing device 10 can acquire information that is more similar to a bodily sensation of the user (for example, video information visually recognized by the user). Further, when, among body parts of the user, a position whose movement is comparatively small when the user moves (in other words, a position at which a posture of the information processing device 10 is more stable) is set as the position in which the information processing device 10 is held, it is possible to reduce an influence of a vibration or the like caused by movement of the user in a case where the information processing device 10 acquires various kinds of information.

Further, in a case where the operation mode transitions between a plurality of modes set as the carry mode c11, the information processing device 10 may operate in accordance with a mode after transition so that the position in which the information processing device 10 itself is held is changed. As a specific example, in a state in which the user bends over at the waist, the information processing device 10 moves to a position set on the back and is held therein, and thereafter, when the information processing device 10 detects that the user stands up and is in an upright stance, the information processing device 10 may move to a position set in the vicinity of the shoulder and be held therein.

Further, as long as operation of the information processing device 10 can be switched in accordance with a mode serving as a transition destination among the plurality of modes set as the carry mode c11, a switching target is not limited to the position in which the information processing device 10 is held. For example, the information processing device 10 may control a state in which the information processing device 10 itself is held, such as a posture in which the information processing device 10 itself is held or a form of the information processing device 10 itself, in accordance with various states such as recognized behavior of the user, a recognized state of the user, and a recognized surrounding environment (external environment).

As a specific example, in a case where the information processing device 10 transitions to the carry mode c11 and is therefore held in a part of the body of the user, the information processing device 10 may control a posture thereof on the basis of a recognized state (for example, posture) of the user so as to face in the same direction as a direction of a line of sight of the user. Note that, at this time, the information processing device 10 may control a direction of the information processing device 10 itself so as to face in the same direction as the direction of the line of sight of the user. Further, the information processing device 10 may perform control so that the information processing device 10 itself (or one or more components thereof and the like) is inclined or is in an upright stance in accordance with a change in the posture of the user. Note that, in this case, it is only necessary to set, as the carry mode c11, a plurality of modes corresponding to the posture of the user and the position in which the information processing device 10 is held and associate the posture of the information processing device 10 with each of the modes.

Further, as another example, the information processing device 10 may control a form of the information processing device 10 itself by, for example, modifying a part of the configuration, such as a structure for holding the information processing device 10 itself. In such a case, the information processing device 10 may control the form of the information processing device 10 itself in accordance with the position in which the information processing device 10 itself is held so that, when the information processing device 10 transitions to the carry mode c11 and is therefore held in a part of the body of the user, the information processing device 10 is held more stably.

Note that, not only regarding the carry mode c11 but also regarding another operation mode, a plurality of different modes may be set.

As a specific example, as the stand-by mode c15, a mode for standing by on the charging stand 70 and a mode for temporarily standing by at a flat position such as a position on a top of a table may be set. In such a case, for example, in a case where the information processing device 10 recognizes that the user returns home, the information processing device 10 may move to the charging stand 70 and stand by thereon. Further, as another example, in a case where the information processing device 10 detects a state in which the user sits at a place where the user visits (for example, a state in which the user sits at a table in a restaurant) and the state continues for a certain time or more, the information processing device 10 may detect a position at which the information processing device 10 can temporarily stand by, move to the detected position, and stand by thereat.

Hereinabove, as Modification example 1, an example of the operation of the information processing device 10 performed in a case where the information processing device 10 transitions to the carry mode c11 has been described with reference to FIG. 7 and FIG. 8.

4.2. Modification Example 2

Example of Control in Accordance with User

Figure 9:
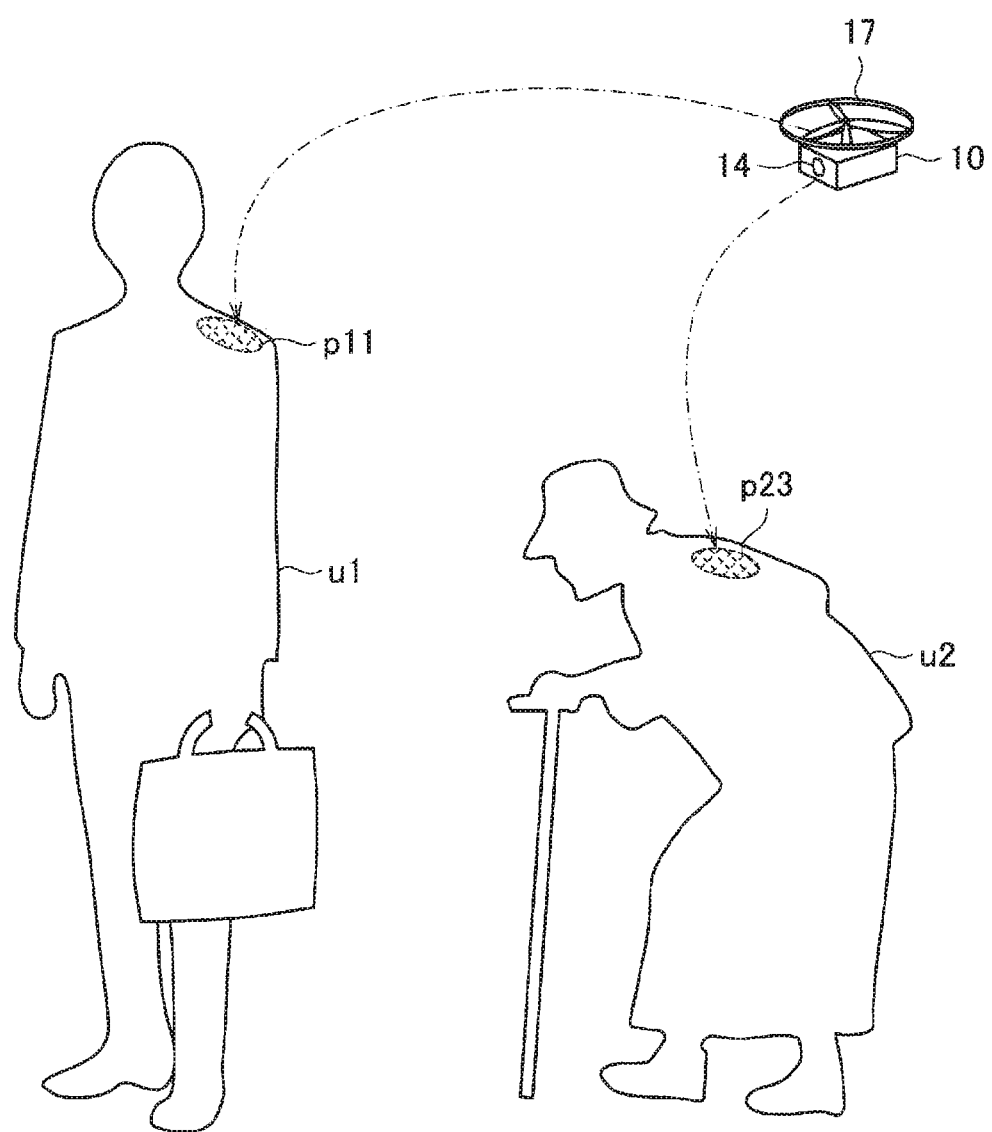
FIG. 9 is an explanatory view for describing an outline of operation of an information processing device according to Modification example 2.

Next, as Modification example 2, an example where, in a situation in which the information processing device 10 is shared by a plurality of users, the information processing device 10 recognizes each user and switches control in accordance with the recognized user will be described with reference to FIG. 9. FIG. 9 is an explanatory view for describing an outline of the operation of the information processing device 10 according to Modification example 2.

In an example shown in FIG. 9, in a case where the information processing device 10 identifies and recognizes the user u1 and the user u2 on the basis of a so-called individual recognition technique and transitions to the carry mode c11 in accordance with the recognized user, the information processing device 10 switches the position in which the information processing device 10 itself is held.

For example, in the example shown in FIG. 9, it is assumed that, in a case where each of the users u1 and u2 moves while carrying the information processing device 10, the user u1 moves in an upright stance in many cases and the user u2 moves while bending over at the waist in many cases. In such a situation, for example, in a case where the information processing device 10 recognizes that a user who carries the information processing device 10 itself is the "user u1", the information processing device 10 moves to the position p11 set in the vicinity of the shoulder of the user u1 and is held in the position p11. Meanwhile, in a case where the information processing device 10 recognizes that a user who carries the information processing device 10 itself is the "user u2", the information processing device 10 moves to the position p23 set on the back of the user u2 and is held in the position p23.

Note that a configuration or system for recognizing an individual is not particularly limited as long as the information processing device 10 can recognize an individual user. As a specific example, the information processing device 10 may recognize an individual user on the basis of a physical characteristic of the user (for example, a part of a body, such as a face, or the whole body) by using an image of the user captured by the imaging unit 14 as input information, as in the case of a so-called face recognition technique. Further, the information processing device 10 may estimate information inherent to the user, such as an age and a sex of the user, and identify an individual user on the basis of the estimation result. Further, as another example, the information processing device 10 may recognize the individual user on the basis of voice of the user collected by a sound collection device (for example, microphone). Note that the information inherent to the user, which is used by the information processing device 10 to identify an individual user, may be information set by the user in advance (that is, information that is explicitly input by the user) or may be information based on a recognition result obtained by the information processing device 10 (in other words, information that is not explicitly input by the user).

Further, the information processing device 10 may indirectly determine each user on the basis of data registered in advance. As a specific example, the information processing device 10 may refer to data indicating schedules of a plurality of users registered in advance and estimate a user having a high probability of carrying the information processing device 10 itself in the current state on the basis of the schedules.

Further, in a case where information for identifying an individual user (for example, name of the user) is detected on the basis of acquired video information or sound information, the information processing device 10 may estimate a user who carries the information processing device 10 itself on the basis of the detected information. Further, the information processing device 10 may acquire information for identifying an individual user (for example, information stored on an electronic tag or the like) from a terminal possessed by the user and identify a user who carries the information processing device 10 itself on the basis of the acquired information.

Further, the example shown in FIG. 9 is merely an example, and operation regarding switching of control in accordance with a recognition result of a user at the time of transition to the carry mode c11, the operation being performed by the information processing device 10, is not necessarily limited only to a holding position of the information processing device 10. For example, in a case where the information processing device 10 can propose various kinds of information to a user, the information processing device 10 may perform control so that the content of proposition is switched in accordance with the recognized user's taste.

Hereinabove, as Modification example 2, an example where, in a situation in which the information processing device 10 is shared by a plurality of users, the information processing device 10 recognizes each user and switches control in accordance with the recognized user has been described with reference to FIG. 9.

4.3. Modification Example 3

Example where a Plurality of Information Processing Devices are Associated

Figure 10:
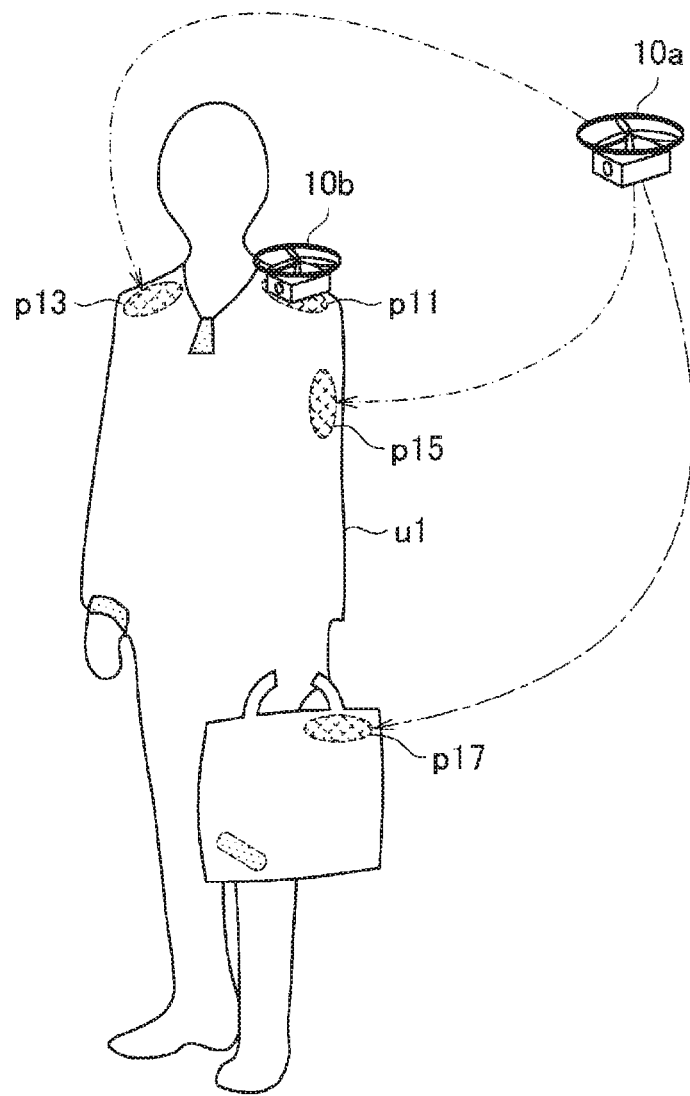
FIG. 10 is an explanatory view for describing an outline of operation of an information processing device according to Modification example 3.

Next, as Modification example 3, an example of operation of a plurality of information processing devices 10 in a situation in which a user carries the information processing devices 10 will be described with reference to FIG. 10. FIG. 10 is an explanatory view for describing an outline of the operation of the information processing device 10 according to Modification example 3. In an example shown in FIG. 10, the user u1 carries, for example, information processing devices 10a and 10b as a plurality of different information processing devices 10.

Note that a specific example of a situation in which the user u1 carries the plurality of information processing devices 10 is, for example, a case where the user u1 carries information processing devices 10 having different executable functions or properties of various functions. As a more specific example, it is possible to expect a case where, when the user u1 properly uses the information processing devices 10 in accordance with a situation or use purpose, such as work or private, the user u1 carries the plurality of information processing devices 10 each of which can execute a function specialized in accordance with the situation or use purpose.

Further, as another example, the user u1 may carry a plurality of information processing devices 10 that perform control differently on the basis of recognized various states (for example, have different determination criteria of a function executed in accordance with a recognized state). As a more specific example, it is possible to expect a case where the user u1 carries both the information processing device 10 that determines a function executed in accordance with the user u1's taste and the information processing device 10 that determines a function executed in accordance with a health condition of the user u1.

As a matter of course, the situation described above is a merely an example and does not limit a state or situation in which the user u1 carries the plurality of information processing devices 10.

As described above, in a situation in which the user u1 carries the plurality of information processing devices 10, each of the plurality of information processing devices 10 may switch control in accordance with a state of another information processing device 10.

For example, the example shown in FIG. 10 shows a state in which the information processing device 10b whose operation mode has transitioned to the carry mode c11 is held in the position p11 set in the vicinity of a left shoulder of the user u1. In such a situation, an operation mode of the information processing device 10a is assumed to transition to the carry mode c11.

In such a case, the information processing device 10a may recognize that the information processing device 10b is held in the position p11 on the basis of, for example, an image of the user u1 captured by the imaging unit 14 and determine a position in which the information processing device 10a itself is held in accordance with a recognition result. As a specific example, in a case where the information processing device 10a recognizes that the information processing device 10b is held in the position p11, the information processing device 10a may specify a position other than the position p11 among the position p11 to position p17 as the position in which the information processing device 10a itself is held (that is, a position at which the information processing device 10a itself is carried).

Note that, as long as the information processing devices 10a and 10b can recognize a state of the other device, a configuration or method for recognizing the state is not particularly limited. As a specific example, the information processing devices 10a and 10b may recognize the state of the other device by establishing communication and transmitting/receiving information on the basis of the communication.

Further, different conditions may be set in the information processing devices 10a and 10b as a condition for transitioning to at least one operation mode among the carry mode c11, the stand-by mode c15, and the drive mode c13. As a specific example, in a situation in which the user u1 moves to the outside, the information processing device 10a may transition to the carry mode c11 in a case of weekdays and the information processing device 10b may transition to the carry mode c11 in a case of holidays.

Further, the information processing devices 10a and 10b may have different configurations of the drive units 17 for moving the information processing devices 10a and 10b themselves. In those configurations, each of the information processing devices 10a and 10b may determine a position in which the information processing device 10a or 10b itself is held in a case where the information processing device 10a or 10b transitions to the carry mode c11 in accordance with the configuration of the drive unit 17 of the information processing device 10a or 10b itself or may determine the position in accordance with the configuration of the drive unit 17 of the other information processing device 10.

As a specific example, it is assumed that the drive unit 17 is configured so that the information processing device 10a moves by flying and the drive unit 17 is configured so that the information processing device 10b moves by running on a ground. At this time, on the basis of, for example, the configuration of the drive unit 17 of the information processing device 10b, the information processing device 10a may recognize, among a plurality of positions set to cause the user u1 to carry the information processing device 10, a position close to feet of the user u1 as the position in which the information processing device 10b is held. That is, in this case, the information processing device 10a may exclude the position close to the feet of the user u1 from candidates for the position in which the information processing device 10a itself is held.

Hereinabove, as Modification example 3, an example of the operation of the plurality of information processing devices 10 in a situation in which the user carries the information processing devices 10 has been described with reference to FIG. 10.

5. EXAMPLES

Next, as Examples, examples of control of the operation mode in accordance with various detected states, the control being performed by the information processing device 10, will be described together with examples of a specific use scene.

Control Example of Operation Mode in Accordance with Situation

First, an example where the information processing device 10 recognizes a situation in which the information processing device 10 itself is used and controls the operation mode in accordance with the recognized situation will be described. Specifically, the information processing device 10 may recognize whether or not a state in which the user carries the information processing device 10 itself is preferable in accordance with the recognized situation and control the operation mode in accordance with a recognition result.

For example, in a situation in which the user enters a shop at which a dress code is set, there is a case where a state in which the information processing device 10 is held in a part of the body (for example, shoulder) of the user is not preferable because of the dress code.

In a case where the information processing device 10 recognizes such a situation, the information processing device 10 may operate so as to cause the operation mode to transition to the stand-by mode c15 to separate from the user, detect a position at which the information processing device 10 itself can stand by, and stand by at the position. In this case, in a case where the information processing device 10 detects that the user leaves the shop, the information processing device 10 may operate so as to cause the operation mode to transition to the carry mode c11 again and be held in a part of the body of the user.

Further, as another example, in a case where the information processing device 10 recognizes a situation in which a state in which the information processing device 10 itself is held in a part of the body of the user is not preferable, the information processing device 10 may operate so as to change a place in which the information processing device 10 itself is held to a part of a possession of the user.

Note that a configuration or method in which the information processing device 10 recognizes the above situation in which a state in which the information processing device 10 itself is held in a part of the body of the user is not preferable is not particularly limited.

As a specific example, a device for transmitting (distributing) information indicating the content of the dress code to the information processing device 10 may be placed in the shop. In such a case, the information processing device 10 may recognize a situation in which a state in which the information processing device 10 itself is held in a part of the body of the user is not preferable on the basis of the information distributed from the device.

Further, as another example, information for allowing the information processing device 10 to recognize the content of the dress code, such as a marker, may be presented in the shop. In such a case, the information processing device 10 may detect the marker presented by the shop on the basis of, for example, an image captured by the imaging unit 14 and recognize a situation in which a state in which the information processing device 10 itself is held in a part of the body of the user is not preferable on the basis of the detected marker. Further, the information is not limited to the marker and the like, and, for example, the information processing device 10 may recognize the content of the dress code by causing the imaging unit 14 to capture an image of a note regarding the dress code placed in the shop and analyzing the captured image of the note.

Further, as another example, the information processing device 10 may access an external server or the like to acquire information on a shop that the user attempts to enter and recognize a situation in which a state in which the information processing device 10 itself is held in a part of the body of the user is not preferable on the basis of the acquired information. In such a case, for example, the information processing device 10 may specify the shop on the basis of position information acquired by the GPS or the like, an image captured by the imaging unit 14, or the like.

Control Example of Operation Mode Based on External Environment

Next, an example where the information processing device 10 recognizes an external environment (for example, an external environment of the information processing device 10 itself or the user) and controls the operation mode in accordance with the recognized external environment will be described. Specifically, the information processing device 10 may recognize weather in an area in which the information processing device 10 itself positions and control the operation mode in accordance with the recognized weather.

For example, in a case where the information processing device 10 recognizes that the weather is rainy, the information processing device 10 may detect a position at which the information processing device 10 itself is hardly wet and move to the detected position. As a specific example, in a case where the information processing device 10 recognizes that the user holds an umbrella, the information processing device 10 may move to a position in the vicinity of an arm or shoulder on the side on which the umbrella is held.

Note that a method in which the information processing device 10 recognizes weather in an area in which the information processing device 10 itself positions has been described above. That is, the information processing device 10 may estimate weather in the area in which the information processing device 10 itself positions on the basis of, for example, information such as an air temperature, a temperature, and a barometric pressure detected by various sensors. Further, as another example, on the basis of recognized position information of the user, the information processing device 10 may acquire information on weather in the area in which the information processing device 10 itself (or user) positions (that is, an area including the recognized position information) from an external server. As a matter of course, as long as the information processing device 10 can recognize weather in the area in which the information processing device 10 itself positions, a configuration or method for the recognition is not particularly limited.

Control Example Where Drive Mode is Caused to Transition to Another Mode

Next, an example of control performed in a case where the information processing device 10 that is operating (moving) in the drive mode c13 is caused to transition to the carry mode c11 or the stand-by mode c15 will be described.

As a specific example, in a case where the information processing device 10 recognizes reduction in the remaining quantity of the battery while operating in the drive mode c13 upon receipt of an instruction from the user, the information processing device 10 may cause the operation mode of the information processing device 10 itself to transition to another operation mode in order to charge the battery.

In such a case, for example, the information processing device 10 may charge the battery by causing the operation mode to transition to the stand-by mode c15, detecting the charging stand 70, and moving to the detected charging stand 70.

Further, as another example, a configuration for charging the battery of the information processing device 10 may be provided at a position in which the information processing device 10 is held in the carry mode c11 (for example, a part of the body of the user). As a specific example, in a use form in which the user wears a unit for holding the information processing device 10 in a part of the body of the user, a mechanism for charging the battery of the information processing device 10 only needs to be provided in the unit.

In such a case, the information processing device 10 only needs to charge the battery by causing the operation mode to transition to the carry mode c11, detecting a position at which the battery of the information processing device 10 itself can be charged, and moving to the detected position.

Further, as another example, in a case where a free space of a storage area of data provided in the information processing device 10 itself is reduced, the information processing device 10 may cause the operation mode of the information processing device 10 itself to transition to another operation mode in order to transfer the data stored in the storage area to another device (for example, server).

In such a case, for example, the information processing device 10 may access a server and transfer data by causing the operation mode to transition to the stand-by mode c15, detecting a position at which an interface that can access the server is provided, and moving to the position. Note that examples of the interface that can access a server encompass a connector to be connected to the server, a communication device for communicating with the server, and the like.

Further, as another example, the interface that can access a server may be provided at a position in which the information processing device 10 is held in the carry mode c11 (for example, a part of the body of the user).

In such a case, the information processing device 10 may access a server and transfer data by causing the operation mode to transition to the carry mode c11, detecting a position at which the interface that can access the server is provided, and moving to the detected position.

Hereinabove, as Examples, examples of control of the operation mode in accordance with various detected states, the control being performed by the information processing device 10, have been described together with examples of a specific use scene.

6. HARDWARE CONFIGURATION

Figure 11:
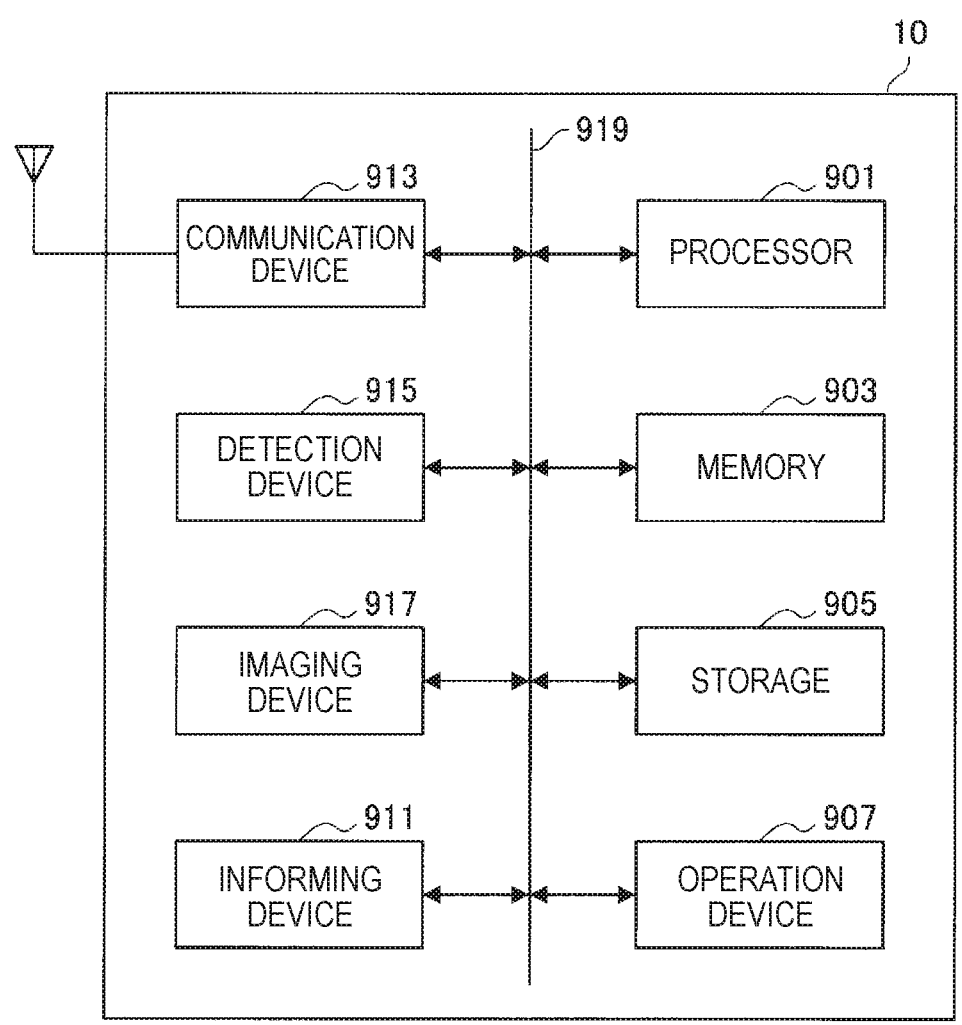
FIG. 11 is a diagram illustrating an example of a hardware configuration of the information processing device according to this embodiment.

Next, an example of a hardware configuration of the information processing device 10 according to each embodiment of the present disclosure will be described with reference to FIG. 11. FIG. 11 is a diagram illustrating an example of the hardware configuration of the information processing device 10 according to an embodiment of the present disclosure.

As shown in FIG. 11, the information processing device 10 according to the present embodiment includes a processor 901, a memory 903, a storage 905, an operation device 907, an informing device 911, a communication device 913, a detection device 915, an imaging device 917, and a bus 919.

The processor 901 may be a central processing unit (CPU), a graphics processing unit (GPU), a digital signal processor (DSP) or a system on chip (SoC), for example, and performs various processes of the information processing device 10. For example, the processor 901 may be configured as an electronic circuit for performing various arithmetic processes. Further, the configuration of the aforementioned controller 12 may be realized by the processor 901.

The memory 903 includes a random access memory (RAM) and a read only memory (ROM) and stores programs executed by the processor 901 and data. The storage 905 may include a storage medium such as a semiconductor memory or a hard disk.

The operation device 907 has a function of generating an input signal for performing a desired operation of a user. The operation device 907 may be configured as a touch panel, for example. As another example, the operation device 907 may be composed of an input unit through which the user inputs information, for example, a button, a switch and the like, an input control circuit that generates an input signal on the basis of input from the user and provides the input signal to the processor 901 and the like. Meanwhile, the aforementioned input unit 15 may be realized by the operation device 907.

The informing device 911 may be an example of an output device and is, for example, a device such as a liquid crystal display (LCD) device or an organic light emitting diode (OLED) display. In this case, the informing device 911 can inform the user of predetermined information by displaying a screen. Further, the informing device 911 may be a device for informing the user of predetermined information by outputting a predetermined sound signal, such as a speaker. Further, the informing device 911 may be a device for informing the user of predetermined information by vibration such as a so-called vibrator. Note that the output unit 16 described above may be realized by the informing device 911.

Further, the examples of the informing device 911 described above are merely examples, and a form of the informing device 911 is not particularly limited as long as the informing device 911 can inform the user of predetermined information. As a specific example, the informing device 911 may be a device for informing the user of predetermined information by using a lighting or blinking pattern, such as a light emitting diode (LED).

The communication device 913 is a communication means included in the information processing device 10 and communicates with an external device through a network. The communication device 913 is a wired or wireless communication interface. When the communication device 913 is configured as a wireless communication interface, the communication device 913 may include a communication antenna, a radio frequency (RF) circuit, a baseband processor and the like.

The communication device 913 has a function of performing various signal processes on a signal from an external device and may provide a digital signal generated from a received analog signal to the processor 901. In addition, the aforementioned communication unit 11 may be realized by the communication device 913.

The detection device 915 is a device for detecting variations in the position and orientation of the housing of the information processing device 10. For example, the detection device 915 may be composed of various sensors such as an acceleration sensor, an angular velocity sensor, etc. In addition, the aforementioned detection unit 13 may be realized by the detection device 915.

The imaging device 917 includes an imaging element for capturing an image of a subject and obtaining digital data of the captured image, such as a complementary metal-oxide semiconductor (CMOS) image sensor or a charge coupled device (CCD) image sensor. That is, the imaging device 917 has a function of capturing a still image or moving image via an optical system such as a lens in accordance with control of the processor 901. The imaging device 917 may store the captured image on the memory 903 or the storage 905. Note that the imaging unit 14 described above may be realized by the imaging device 917.

The bus 919 connects the processor 901, the memory 903, the storage 905, the operation device 907, the display device 909, the communication device 913, the detection device 915, and the imaging device 917 to one another. The bus 919 may include a plurality of types of buses.

Furthermore, a program for causing hardware such as a processor, a memory and a storage included in a computer to execute the same functions as components of the aforementioned information processing device 10 may be created. In addition, a computer readable recording medium storing the program may be provided.

7. CONCLUSION

Hereinabove, as described above, the information processing device 10 according to the present embodiment recognizes various states such as behavior of the user, a state of the user, and a surrounding environment (external environment) on the basis of information acquired by at least one of the configurations of the imaging unit 14, the detection unit 13, and the another information processing device 30. Then, the information processing device 10 determines a state or situation in which the user needs to carry the information processing device 10 itself on the basis of the recognized various states and automatically operates so as to realize a state in which the information processing device 10 itself is carried by the user in accordance with the determination result.

With this, the user does not need to be explicitly conscious of operation of recognizing a change in various states (for example, a change in behavior or a state of the user himself/herself) and carrying the information processing device 10, and therefore it is also possible to prevent a situation in which the user forgets to carry the information processing device 10 when, for example, the user goes out.

Further, the information processing device 10 according to the present embodiment may determine a state or situation in which the user does not need to carry the information processing device 10 itself (or it is desirable not to carry the information processing device 10 itself) and may automatically separate from the user in accordance with the determination result. With this, the user does not need to be explicitly conscious of bothering operation in which the user recognizes a change in various states (for example, a change in surrounding environment) and removes the information processing device 10.

That is, the information processing device 10 according to the present embodiment switches a state in which the information processing device 10 itself is carried and a state in which the information processing device 10 itself is not carried in accordance with a state or situation in which the information processing device 10 itself is used (that is, various states such as behavior of the user, a state of the user, and a surrounding environment (external environment)), without the user performing explicit operation (that is, automatically). With this configuration, in a situation in which the information processing device 10 may be used, the user can carry the information processing device 10 in a more suitable form, without being explicitly conscious of whether or not it is necessary to carry the information processing device 10.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:
an acquisition unit configured to acquire information on a user; and
a controller configured to execute a control process for moving a device that can be carried by the user so that the device changes between a carry state in which the device is carried by the user and a non-carry state in which the device is not carried by the user on the basis of the information on the user.

(2)

The information processing device according to (1), wherein the device includes a drive unit for moving a housing of the device, and the non-carry state includes a state in which operation of the drive unit is controlled.

(3)

The information processing device according to (2), wherein the controller controls the operation of the drive unit in at least one of the non-carry states.

(4)

The information processing device according to (2), wherein the non-carry state includes a state in which the device controls the operation of the drive unit.

(5)

The information processing device according to any one of (2) to (4), wherein the operation of the drive unit is controlled so that the device moves to a detected position that satisfies a predetermined condition in the carry state.

(6)

The information processing device according to any one of (1) to (5), wherein the information on the user includes information on at least one of recognized behavior and state of the user.

(7)

The information processing device according to (6), wherein the information on the user includes information indicating a recognized state of an environment around the user.

(8)

The information processing device according to (7), wherein the information on the user includes information indicating a state of the device in accordance with use of the device.

(9)

The information processing device according to any one of (6) to (8), wherein the information on at least one of the behavior and state of the user includes information that is explicitly input by the user.

(10)

The information processing device according to any one of (6) to (9), wherein the information on at least one of the behavior and state of the user includes information that is not explicitly input by the user.

(11)

The information processing device according to any one of (1) to (5), wherein the information on the user includes information indicating a recognized state of an environment around the user.

(12)

The information processing device according to any one of (1) to (5), wherein the information on the user includes information indicating a state of the device in accordance with use of the device.

(13)

The information processing device according to any one of (1) to (12), wherein the carry state includes a plurality of different states, and on the basis of the acquired information on the user, the controller switches a state of the device to a state associated with the information in advance among the plurality of states.

(14)

The information processing device according to (13), wherein the device is held in a position that satisfies a predetermined condition in the carry state, and the controller controls the device so that the device is held in the position corresponding to a mode associated with the acquired information on the user among the plurality of modes included in the carry state.

(15)

The information processing device according to (14), wherein the position in which the device is held is set to at least one of a part of a body of the user and an object carried by the user, the object being different from the device.

(16)

The information processing device according to any one of (13) to (15), wherein the controller controls a state in which the device is held in accordance with a state associated with the acquired information on the user among the plurality of states included in the carry state.

(17)

The information processing device according to (16), wherein the controller controls, as the state in which the device is held, at least one of a posture in which the device is held and a form in which the device is held.

(18)

The information processing device according to any one of (1) to (17), wherein the non-carry state includes a mode in which the device is controlled to stand by at a position that satisfies a predetermined condition.

(19)

An information processing method including:

acquiring information on a user; and executing, by a processor, a control process for moving a device that can be carried by the user so that the device changes between a carry state in which the device is carried by the user and a non-carry state in which the device is not carried by the user on the basis of the information on the user.

(20)

A program causing a computer to execute acquiring information on a user, and executing a control process for moving a device that can be carried by the user so that the device changes between a carry state in which the device is carried by the user and a non-carry state in which the device is not carried by the user on the basis of the information on the user.

REFERENCE SIGNS LIST

10 information processing device
11 communication unit
12 controller
121 communication controller
123 monitoring unit
125 mode controller
127 processing execution unit
13 detection unit
131 sensor 133 position detection unit
14 imaging unit
15 input unit
16 output unit
17 drive unit
30 information processing device
31 communication unit
32 controller
321 communication controller
323 association processing unit
33 detection unit

The invention claimed is:

1. An information processing device, comprising:
an acquisition unit configured to acquire real time information associated with a user; and
a controller configured to:
control autonomous movement of a device in a drive mode, wherein the autonomous movement is controlled based on the acquired real time information associated with the user; and
autonomously switch a mode of the device from the drive mode to a stand-by mode based on the acquired real time information associated with the user, wherein
in the stand-by mode, the device stands by at a first position that satisfies a first condition.

2. The information processing device according to claim 1,
wherein the real time information associated with the user includes information indicating a recognized state of an environment around the user.

3. The information processing device according to claim 1,
wherein the real time information associated with the user includes information indicating a state of the device based on usage of the device.

4. The information processing device according to claim 1, wherein
the device includes a drive unit to move a housing of the device in the drive mode.

5. The information processing device according to claim 4,
wherein the controller is further configured to control an operation of the drive unit in the drive mode.

6. The information processing device according to claim 4,
wherein in the drive mode the device controls an operation of the drive unit.

7. The information processing device according to claim 4, wherein the controller is further configured to control operation of the drive unit to move the device to the first position that satisfies the first condition.

8. The information processing device according to claim 1,
wherein the real time information associated with the user includes first information on at least one of recognized behavior of the user or a recognized state of the user.

9. The information processing device according to claim 8,
wherein the real time information associated with the user includes second information indicating a recognized state of an environment around the user.

10. The information processing device according to claim 9,
wherein the real time information associated with the user includes third information indicating a state of the device based on usage of the device.

11. The information processing device according to claim 8,
wherein the first information includes information explicitly input by the user.

12. The information processing device according to claim 8,
wherein the first information includes information not explicitly input by the user.

13. The information processing device according to claim 1, wherein
the controller is further configured to autonomously switch the mode of the device from the stand-by mode to a carry mode based on the real time information, and
in the carry mode the device is carried by the user.

14. The information processing device according to claim 13, wherein
in the carry mode, the device is held in a second position that satisfies a second condition,
the controller is further configured to control the device to autonomously hold the device in the second position, and
the device is controlled based on the acquired real time information.

15. The information processing device according to claim 14, wherein
the second position in which the device is held is set to at least one of a part of a body of the user or an object carried by the user, and
the object is different from the device.

16. The information processing device according to claim 14, wherein
the controller is further configured to control a state in which the device is held at the second position, and
the state is controlled based on the acquired real time information.

17. The information processing device according to claim 16,
wherein the controller is further configured to control, as the state in which the device is held at the second position, at least one of a posture in which the device is held or a form in which the device is held.

18. An information processing method, comprising:
in an information processing device comprising a processor:
acquiring, by the processor, real time information associated with a user;
controlling, by the processor, autonomous movement of a device in a drive mode, wherein the autonomous movement is controlled based on the real time information associated with the user; and
autonomously switching a mode of the device from the drive mode to a stand-by mode based on the real time information associated with the user, wherein
in the stand-by mode, the device stands by at a first position that satisfies a first condition.

19. A non-transitory computer-readable medium having stored thereon, computer-executable instructions which, when executed by a computer, cause the computer to execute operations, the operations comprising:
acquiring real time information associated with a user;
controlling autonomous movement of a device in a drive mode, wherein the autonomous movement is controlled based on the real time information associated with the user; and
autonomously switching a mode of the device from the drive mode to a stand-by mode based on the real time information associated with the user, wherein in the stand-by mode, the device stands by at a first position that satisfies a first condition.

* * * * *